US012222159B2

(12) United States Patent
Yoon et al.

(10) Patent No.: US 12,222,159 B2
(45) Date of Patent: Feb. 11, 2025

(54) APPARATUS AND METHOD FOR TREATING SUBSTRATE

(71) Applicant: SEMES CO., LTD., Cheonan-si (KR)

(72) Inventors: Do Hyeon Yoon, Cheonan-si (KR); Yong Hyun Choi, Suwon-si (KR); Eui Sang Lim, Cheonan-si (KR); Jun Young Choi, Cheongju-si (KR)

(73) Assignee: SEMES CO., LTD., Cheonan-si (KR)

( * ) Notice: Subject to any disclaimer, the term of this patent is extended or adjusted under 35 U.S.C. 154(b) by 771 days.

(21) Appl. No.: 17/408,953

(22) Filed: Aug. 23, 2021

(65) Prior Publication Data

US 2022/0090859 A1 Mar. 24, 2022

(30) Foreign Application Priority Data

Sep. 18, 2020 (KR) ........................ 10-2020-0120329

(51) Int. Cl.
*F26B 21/14* (2006.01)
*F26B 5/14* (2006.01)
*F26B 21/10* (2006.01)

(52) U.S. Cl.
CPC ................ *F26B 21/14* (2013.01); *F26B 5/14* (2013.01); *F26B 21/10* (2013.01)

(58) Field of Classification Search
CPC ............. F26B 21/14; F26B 5/14; F26B 21/10
USPC ............................................................ 34/406
See application file for complete search history.

(56) References Cited

U.S. PATENT DOCUMENTS

| | | | | |
|---|---|---|---|---|
| 6,067,728 A * | 5/2000 | Farmer | H01L 21/6719 | 34/470 |
| 6,286,231 B1 * | 9/2001 | Bergman | H01L 21/67028 | 34/558 |
| 6,920,703 B2 * | 7/2005 | Taktsu | G03F 7/40 | 34/76 |
| 7,181,862 B2 * | 2/2007 | Boara | C03C 3/06 | 516/85 |
| 8,898,928 B2 * | 12/2014 | Sirard | H01L 21/6831 | 118/728 |
| 10,504,718 B2 * | 12/2019 | Ohno | H01L 21/02101 | |

(Continued)

FOREIGN PATENT DOCUMENTS

| | | | | |
|---|---|---|---|---|
| CA | 2700118 A1 * | 4/2009 | B01D 1/18 | |
| CN | 114203580 A * | 3/2022 | F26B 21/10 | |

(Continued)

OTHER PUBLICATIONS

Office Action from the Japan Patent Office dated Nov. 1, 2022.
Office Action from the Korean Intellectual Property Office dated Nov. 17, 2022.

*Primary Examiner* — Stephen M Gravini

(57) ABSTRACT

An apparatus for treating a substrate includes a body having an inner space in which the substrate is dried by a drying fluid in a supercritical state, a fluid supply unit that supplies the drying fluid into the inner space, a fluid exhaust unit that releases the drying fluid from the inner space, and a controller. The controller controls the fluid supply unit and the fluid exhaust unit to perform a pressure-raising step of raising pressure in the inner space to a set pressure and a flow step of generating a flow of the drying gas in the inner space by releasing, by the fluid exhaust unit, the drying fluid from the inner space while the fluid supply unit supplies the drying fluid into the inner space.

19 Claims, 15 Drawing Sheets

(56) References Cited

U.S. PATENT DOCUMENTS

| | | | | |
|---|---|---|---|---|
| 10,576,493 | B2 * | 3/2020 | Egashira | B05C 5/0225 |
| 10,619,922 | B2 * | 4/2020 | Goshi | F26B 9/06 |
| 11,384,980 | B2 * | 7/2022 | Triglia, Jr. | F26B 13/008 |
| 11,942,337 | B2 * | 3/2024 | Lim | H01J 37/32715 |
| 11,955,350 | B2 * | 4/2024 | Sumi | F26B 5/005 |
| 2022/0090859 | A1 * | 3/2022 | Yoon | F26B 21/14 |
| 2022/0290921 | A1 * | 9/2022 | Choi | H01L 21/67028 |

FOREIGN PATENT DOCUMENTS

| | | | | |
|---|---|---|---|---|
| EP | 2205336 | B1 * | 10/2018 | B01D 1/18 |
| JP | 2009194092 | | 8/2009 | |
| JP | 2013251550 | | 12/2013 | |
| JP | 201882099 | | 5/2018 | |
| JP | 2018152479 | | 9/2018 | |
| JP | 2020025013 | | 2/2020 | |
| JP | 6740098 | B2 * | 8/2020 | H01L 21/02057 |
| JP | 2022051531 | A * | 3/2022 | F26B 21/10 |
| KR | 10-2014-0047643 | | 4/2014 | |
| KR | 101856606 | | 5/2018 | |
| KR | 1020180136863 | | 12/2018 | |
| KR | 1020190011472 | | 2/2019 | |
| KR | 1020190138267 | | 12/2019 | |
| KR | 20220037632 | A * | 3/2022 | |
| KR | 102482206 | B1 * | 12/2022 | |
| WO | 20120013583 | | 10/2012 | |

* cited by examiner

APPARATUS AND METHOD FOR TREATING SUBSTRATE

CROSS-REFERENCE TO RELATED APPLICATIONS

A claim for priority under 35 U.S.C. § 119 is made to Korean Patent Application No. 10-2020-0120329 filed on Sep. 18, 2020, in the Korean Intellectual Property Office, the entire contents of which are hereby incorporated by reference.

BACKGROUND

Embodiments of the inventive concept described herein relate to an apparatus and method for treating a substrate.

To manufacture semiconductor elements, desired patterns are formed on a substrate, such as a wafer, through various processes such as photolithography, etching, ashing, ion implantation, thin film deposition, and the like. Various process liquids and process gases are used in the processes, and particles and process by-products are generated during the processes. To remove the particles and the process by-products from the substrate, a cleaning process is performed before and after the processes.

In a general cleaning process, a substrate is treated with a chemical and a rinsing solution and then subjected to a drying process. As an example of the drying process, a spin drying process of removing a rinsing solution remaining on a substrate by rotating the substrate at high speed is exemplified. However, in the case of the spin drying process, there is a risk of collapse of patterns formed on the substrate.

Accordingly, a supercritical drying process of replacing a residual rinsing solution on a substrate with an organic solvent having low surface tension, such as isopropyl alcohol (IPA), and removing the organic solvent remaining on the substrate with a process fluid in a supercritical state is used. In the supercritical drying process, a drying gas is supplied into a sealed process chamber, and the drying gas is heated and pressurized. The temperature and pressure of the drying gas are raised to critical points or more, and the drying gas experiences a phase change into a supercritical state.

The drying gas in the supercritical state has high solubility and permeability. That is, when the drying gas in the supercritical state is supplied to the substrate, the drying gas easily permeates into patterns on the substrate, and the organic solvent remaining on the substrate is easily dissolved in the drying gas. Thus, the organic solvent remaining between the patterns formed on the substrate may be easily removed.

However, the drying gas in the supercritical state in the process chamber has low fluidity. Therefore, the drying gas in the supercritical state may not be appropriately delivered to the substrate. In this case, the organic solvent remaining on the substrate may not be appropriately removed, or the drying gas in the supercritical state in which the organic solvent is dissolved may not be appropriately released outside the process chamber.

To solve this problem, a method of changing pressure in the process chamber as illustrated in FIG. 1 is generally used. Referring to FIG. 1, in pressure-raising step S100, the pressure in the process chamber is raised to a first pressure CP1, and in process step S200, the pressure in the process chamber is repeatedly changed between the first pressure CP1 and a second pressure CP2 lower than the first pressure CP1. Thereafter, in vent step S300, the pressure in the process chamber is changed to the atmospheric pressure. By repeatedly changing the pressure in the process chamber in process step S200, a flow of the drying gas in the supercritical state may be generated in the process chamber, and the drying gas in the supercritical state may be delivered to the substrate.

The method of repeatedly changing the pressure in the process chamber between the first pressure CP1 and the second pressure CP2 is generally performed by repeatedly turning on/off a valve installed on a supply line that supplies the drying gas into the process chamber and a valve installed on an exhaust line that evacuates the inner space of the process chamber. When the valves are repeatedly turned on/off, particles may be generated in the valves and may be delivered to the process chamber through the supply line or the exhaust line. Furthermore, the method of repeatedly changing the pressure in the process chamber between the first pressure CP1 and the second pressure CP2 increases time spent performing process step S200. This is because there is a physical limitation in reduction of time spent raising or lowering the pressure in process step S200. In addition, when the valves are rapidly turned on/off to reduce the time spent raising or lowering the pressure, the pressure may not be appropriately raised or lowered, and there is a risk that the flow of the drying gas in the supercritical state is hampered.

SUMMARY

Embodiments of the inventive concept provide a substrate treating apparatus and method for efficiently treating a substrate.

Furthermore, embodiments of the inventive concept provide a substrate treating apparatus and method for improving efficiency in drying a substrate.

Moreover, embodiments of the inventive concept provide a substrate treating apparatus and method for reducing time spent performing a drying process of drying a substrate.

In addition, embodiments of the inventive concept provide a substrate treating apparatus and method for minimizing impurities, such as particles, while performing a drying process of drying a substrate.

The technical problems to be solved by the inventive concept are not limited to the aforementioned problems, and any other technical problems not mentioned herein will be clearly understood from the following description by those skilled in the art to which the inventive concept pertains.

According to an embodiment, an apparatus for treating a substrate includes a body having an inner space in which the substrate is dried by a drying fluid in a supercritical state, a fluid supply unit that supplies the drying fluid into the inner space, a fluid exhaust unit that releases the drying fluid from the inner space, and a controller. The controller controls the fluid supply unit and the fluid exhaust unit to perform a pressure-raising step of raising pressure in the inner space to a set pressure and a flow step of generating a flow of the drying gas in the inner space by releasing, by the fluid exhaust unit, the drying fluid from the inner space while the fluid supply unit supplies the drying fluid into the inner space.

According to an embodiment, the controller may control the fluid supply unit and the fluid exhaust unit such that the pressure in the inner space is maintained at the set pressure while the flow step is performed.

According to an embodiment, the controller may control the fluid supply unit and the fluid exhaust unit such that an amount of the drying fluid supplied into the inner space per unit time by the fluid supply unit and an amount of the drying fluid released from the inner space per unit time by the fluid exhaust unit are the same as each other while the flow step is performed.

According to an embodiment, the fluid exhaust unit may include a main exhaust line connected with the body and a first exhaust valve that causes the drying fluid to selectively flow through the main exhaust line, and the controller may control the fluid supply unit and the fluid exhaust unit such that the first exhaust valve remains turned on while the flow step is performed.

According to an embodiment, the fluid exhaust unit may further include a flow line that branches from the main exhaust line and that has the first exhaust valve installed thereon, a slow vent line that branches from the main exhaust line and that has a second exhaust valve installed thereon, and a quick vent line that branches from the main exhaust line and that has a third exhaust valve installed thereon, in which an amount of the drying fluid released per unit time through the quick vent line is greater than an amount of the drying fluid released per unit time through the slow vent line.

According to an embodiment, the controller may control the fluid supply unit and the fluid exhaust unit to additionally perform a first vent step of lowering the pressure in the inner space by releasing the drying fluid in the inner space through the slow vent line by turning on the second exhaust valve and a second vent step of lowering the pressure in the inner space through the quick vent line by turning on the third exhaust valve.

According to an embodiment, a pressure adjustment member may be installed on the flow line to measure pressure of the drying fluid flowing through the main exhaust line and adjust the pressure in the inner space to the set pressure by adjusting an amount of the drying fluid released per unit time through the flow line.

According to an embodiment, the controller may control the fluid supply unit and the fluid exhaust unit such that the flow step is performed for a time period between 20 seconds and 65 seconds.

According to an embodiment, the controller may control the fluid supply unit and the fluid exhaust unit such that the flow step is performed for a time period between 25 seconds and 65 seconds.

According to an embodiment, the controller may control the fluid supply unit and the fluid exhaust unit such that the set pressure ranges from 120 Bar to 150 Bar.

According to an embodiment, the controller may control the fluid supply unit and the fluid exhaust unit such that the set pressure is equal to 150 Bar.

According to an embodiment, an apparatus for treating a substrate includes a body having an inner space in which the substrate is dried by a drying fluid in a supercritical state, a fluid supply unit that supplies the drying fluid into the inner space, a fluid exhaust unit that releases the drying fluid from the inner space, and a controller. The fluid exhaust unit includes a main exhaust line connected with the body and a first exhaust valve that causes the drying fluid to selectively flow through the main exhaust line. The controller performs a pressure-raising step of raising pressure in the inner space to a set pressure, a flow step of maintaining the pressure in the inner space at the set pressure, and a vent step of lowering the pressure in the inner space. The controller controls the fluid supply unit and the fluid exhaust unit such that the first exhaust valve remains turned on during the flow step.

According to an embodiment, the controller may control the fluid supply unit and the fluid exhaust unit such that an amount of the drying fluid supplied per unit time by the fluid supply unit and an amount of the drying fluid released per unit time through the main exhaust line are the same as each other during the flow step.

According to an embodiment, the fluid exhaust unit may further include a pressure adjustment member that adjusts the pressure in the inner space to the set pressure, based on pressure of the drying fluid flowing through the main exhaust line during the flow step.

According to an embodiment, the main exhaust line may branch into branch lines, and the branch lines may include a vent line that lowers the pressure in the inner space and a flow line having the first exhaust valve and the pressure adjustment member installed thereon.

According to an embodiment, the fluid supply unit may include a first supply line that supplies the drying fluid from above the substrate supported in the inner space and a second supply line that supplies the drying fluid from below the substrate supported in the inner space.

According to an embodiment, the fluid supply unit may include a first supply line that supplies the drying fluid from a side to the substrate supported in the inner space and a second supply line that supplies the drying fluid from below the substrate supported in the inner space.

According to an embodiment, an apparatus for treating a substrate includes a body having an inner space in which an organic solvent remaining on the substrate is dried by a drying fluid in a supercritical state, a fluid supply unit that supplies the drying fluid into the inner space, a fluid exhaust unit that releases the drying fluid from the inner space, and a controller. The controller performs a pressure-raising step of raising pressure in the inner space to a set pressure by supplying, by the fluid supply unit, the drying fluid into the inner space, a flow step of generating a flow of the drying gas in the inner space by releasing, by the fluid exhaust unit, the drying fluid from the inner space while the fluid supply unit supplies the drying fluid into the inner space, and a vent step of lowering the pressure in the inner space by releasing, by the fluid exhaust unit, the drying fluid from the inner space. The controller controls the fluid supply unit and the fluid exhaust unit such that an amount of the drying fluid supplied into the inner space per unit time by the fluid supply unit and an amount of the drying fluid released from the inner space per unit time by the fluid exhaust unit are the same as each other while the flow step is performed.

According to an embodiment, the fluid exhaust unit may include a main exhaust line that is connected with the body and that evacuates the inner space, a vent line that branches from the main exhaust line and lowers the pressure in the inner space, and a flow line that branches from the main exhaust line and that has a pressure adjustment member and a first exhaust valve installed thereon, in which the pressure adjustment member adjusts the pressure in the inner space to the set pressure, based on pressure of the drying fluid flowing through the main exhaust line. The controller may control the fluid supply unit and the fluid exhaust unit such that while the flow step is performed, the first exhaust valve remains turned on to release the drying fluid through the main exhaust line and the flow line.

According to an embodiment, the vent line may include a quick vent line having a third exhaust valve installed thereon and a slow vent line having a second exhaust valve installed thereon, in which an amount of the drying fluid released per unit time through the slow vent line is less than an amount of the drying fluid released per unit time through the quick vent line. The controller may control the second exhaust valve and the third exhaust valve such that in the vent step, the drying fluid is released through the quick vent line after the drying fluid is released through the slow vent line.

According to an embodiment, a method for treating a substrate includes a liquid treatment step of performing liquid treatment on the substrate by supplying an organic solvent to the substrate, a transfer step of transferring the substrate having the organic solvent remaining thereon to a body having an inner space in which the substrate is dried, and a drying step of drying the substrate by supplying a drying fluid in a supercritical state to the substrate in the inner space. The drying step includes a pressure-raising step of raising pressure in the inner space to a set pressure, a flow step of generating a flow of the drying fluid in the inner space by making an amount of the drying fluid supplied into the inner space per unit time and an amount of the drying fluid released from the inner space per unit time the same for a set period of time, and a vent step of lowering the pressure in the inner space.

According to an embodiment, in the flow step, the pressure in the inner space may be maintained at the set pressure, and the set pressure may range from 120 Bar to 150 Bar.

According to an embodiment, the set pressure may be 150 Bar.

According to an embodiment, the set period of time may range from 20 seconds to 65 seconds.

According to an embodiment, the set period of time may range from 25 seconds to 60 seconds.

According to an embodiment, a first exhaust valve that causes the drying fluid to selectively flow through a main exhaust line that evacuates the inner space may remain turned on while the flow step is performed.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
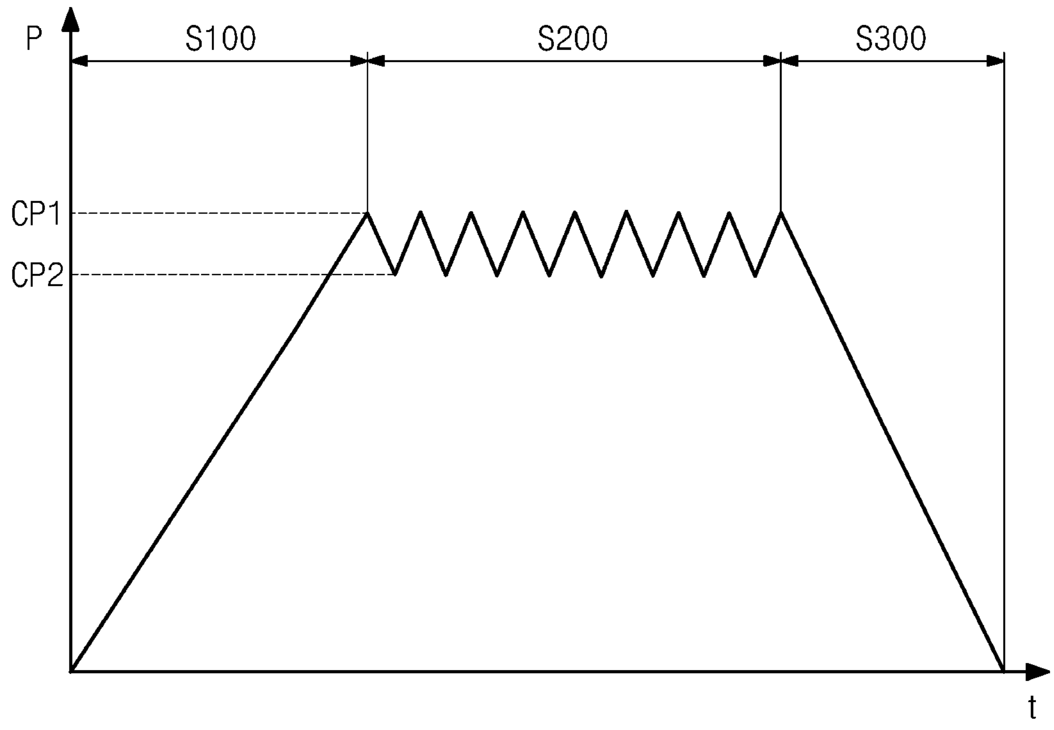
FIG. 1 is a view illustrating a pressure change in a process chamber performing a general supercritical drying process.

Hereinafter, embodiments of the inventive concept will be described in detail with reference to the accompanying drawings such that those skilled in the art to which the inventive concept pertains can readily carry out the inventive concept. However, the inventive concept may be implemented in various different forms and is not limited to the embodiments described herein. Furthermore, in describing the embodiments of the inventive concept, detailed descriptions related to well-known functions or configurations will be omitted when they may make subject matters of the inventive concept unnecessarily obscure. In addition, components performing similar functions and operations are provided with identical reference numerals throughout the accompanying drawings.

The terms "include" and "comprise" in the specification are "open type" expressions just to say that the corresponding components exist and, unless specifically described to the contrary, do not exclude but may include additional components. Specifically, it should be understood that the terms "include", "comprise", and "have", when used herein, specify the presence of stated features, integers, steps, operations, components, and/or parts, but do not preclude the presence or addition of one or more other features, integers, steps, operations, components, parts, and/or groups thereof.

The terms of a singular form may include plural forms unless otherwise specified. Furthermore, in the drawings, the shapes and dimensions of components may be exaggerated for clarity of illustration.

The terms such as first, second, and the like may be used to describe various components, but the components should not be limited by the terms. The terms may be used only for distinguishing one component from others. For example, without departing the scope of the inventive concept, a first component may be referred to as a second component, and similarly, the second component may also be referred to as the first component.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

Unless otherwise defined, all terms used herein, including technical or scientific terms, have the same meanings as those generally understood by those skilled in the art to which the inventive concept pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
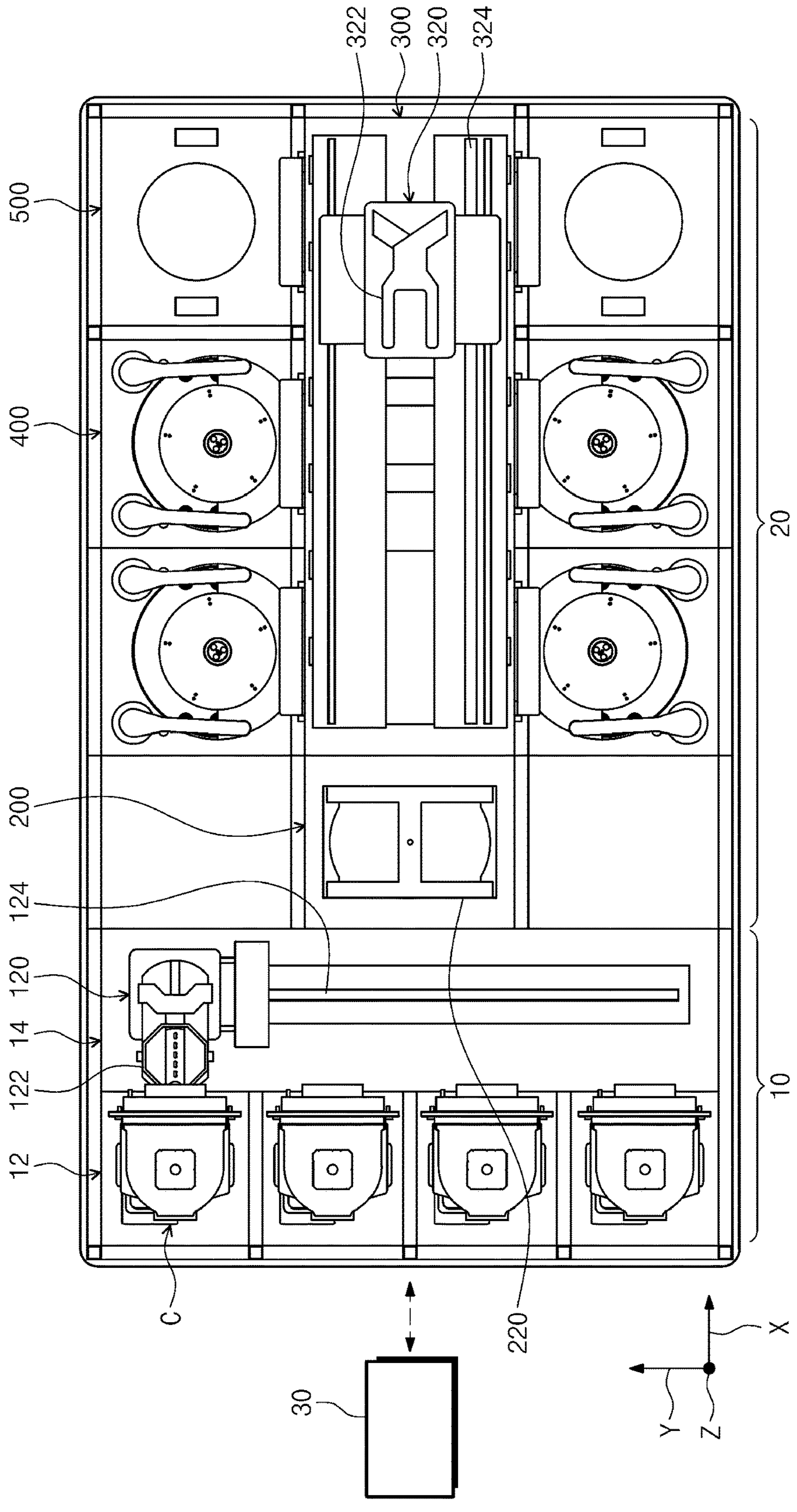
FIG. 2 is a schematic plan view illustrating a substrate treating apparatus according to an embodiment of the inventive concept.

FIG. 2 is a schematic plan view illustrating a substrate treating apparatus according to an embodiment of the inventive concept.

Referring to FIG. 2, the substrate treating apparatus includes an index module 10, a process module 20, and a controller 30. When viewed from above, the index module 10 and the process module 20 are disposed along one direction. Hereinafter, a direction in which the index module 10 and the process module 20 are disposed is referred to as a first direction X, a direction perpendicular to the first direction X when viewed from above is referred to as a second direction Y, and a direction perpendicular to both the first direction X and the second direction Y is referred to as a third direction Z.

The index module 10 transfers substrates W from a carrier C, in which the substrates W are received, to the process module 20 and places, in the carrier C, the substrates W completely treated in the process module 20. The lengthwise direction of the index module 10 is parallel to the second direction Y. The index module 10 has a load port 12 and an index frame 14. The load port 12 is located on the opposite side to the process module 20 with respect to the index frame 14. The carrier C having the substrates W received therein is placed on the load port 12. A plurality of load ports 12 may be provided. The plurality of load ports 12 may be disposed along the second direction Y.

An airtight carrier, such as a front open unified pod (FOUP), may be used as the carrier C. The carrier C may be placed on the load port 12 by a transfer unit (not illustrated), such as an overhead transfer, an overhead conveyor, or an automatic guided vehicle, or by an operator.

An index robot 120 is provided in the index frame 14. A guide rail 124, the lengthwise direction of which is parallel to the second direction Y, may be provided in the index frame 14, and the index robot 120 is movable on the guide rail 124. The index robot 120 includes hands 122 on which the substrates W are placed. The hands 122 are movable forward and backward, rotatable about an axis facing the third direction Z, and movable along the third direction Z. The hands 122 may be spaced apart from each other in an up/down direction. The hands 122 may independently move forward and backward.

The controller 30 may control the substrate treating apparatus. The controller 30 may include a process controller, a user interface, and a storage unit. The process controller may include a microprocessor (a computer) that controls the substrate treating apparatus. The user interface may include a keyboard through which an operator inputs a command to manage the substrate treating apparatus or a display that visually displays an operational state of the substrate treating apparatus. The storage unit may store a process recipe, such as a control program for executing a process performed in the substrate treating apparatus under the control of the process controller or a program for causing each component to execute a process according to various types of data and process conditions. The user interface and the storage unit may be connected to the process controller. The process recipe may be stored in a storage medium of the storage unit. The storage medium may be a hard disk, a portable disk, such as CD-ROM, DVD, or the like, or a semiconductor memory, such as a flash memory, or the like.

The controller 30 may control the substrate treating apparatus to perform a substrate treating method to be described below. For example, the controller 30 may control a fluid supply unit 530 and a fluid exhaust unit 550 to perform the substrate treating method to be described below.

The process module 20 includes a buffer unit 200, a transfer chamber 300, liquid treatment chambers 400, and drying chambers 500. The buffer unit 200 provides a space in which substrates W carried into the process module 20 and substrates W to be carried out of the process module 20 temporarily stay. The liquid treatment chambers 400 perform liquid treatment processes of treating the substrates W by dispensing liquids onto the substrates W. The drying chambers 500 perform drying processes of removing the liquids remaining on the substrates W. The transfer chamber 300 transfers the substrates W between the buffer unit 200, the liquid treatment chambers 400, and the drying chambers 500.

The transfer chamber 300 may be disposed such that the lengthwise direction thereof is parallel to the first direction X. The buffer unit 200 may be disposed between the index module 10 and the transfer chamber 300. The liquid treatment chambers 400 and the drying chambers 500 may be disposed on lateral sides of the transfer chamber 300. The liquid treatment chambers 400 and the transfer chamber 300 may be disposed along the second direction Y. The drying chambers 500 and the transfer chamber 300 may be disposed along the second direction Y. The buffer unit 200 may be located at one end of the transfer chamber 300.

According to an embodiment, the liquid treatment chambers 400 may be disposed on opposite sides of the transfer chamber 300. The drying chambers 500 may be disposed on the opposite sides of the transfer chamber 300. The liquid treatment chambers 400 may be disposed closer to the buffer unit 200 than the drying chambers 500. On one side of the transfer chamber 300, the liquid treatment chambers 400 may be arranged in an A×B array (A and B being natural numbers of 1 or larger) along the first direction X and the third direction Z. Furthermore, the drying chambers 500 may be arranged in a C×D array (C and D being natural numbers of 1 or larger) on the one side of the transfer chamber 300 along the first direction X and the third direction Z. Alternatively, only the liquid treatment chambers 400 may be arranged on the one side of the transfer chamber 300, and only the drying chambers 500 may be arranged on the opposite side of the transfer chamber 300.

The transfer chamber 300 has a transfer robot 320. A guide rail 324, the lengthwise direction of which is parallel to the first direction X, may be provided in the transfer chamber 300, and the transfer robot 320 is movable on the guide rail 324. The transfer robot 320 includes hands 322 on which the substrates W are placed. The hands 322 are movable forward and backward, rotatable about an axis facing the third direction Z, and movable along the third direction Z. The hands 322 may be spaced apart from each other in the up/down direction. The hands 322 may independently move forward and backward.

The buffer unit 200 includes a plurality of buffers 220 in which the substrates W are placed. The buffers 220 may be spaced apart from each other along the third direction Z. A front face and a rear face of the buffer unit 200 are open. The front face is a face that faces the index module 10, and the rear face is a face that faces the transfer chamber 300. The index robot 120 may access the buffer unit 200 through the front face, and the transfer robot 320 may access the buffer unit 200 through the rear face.

Figure 3:
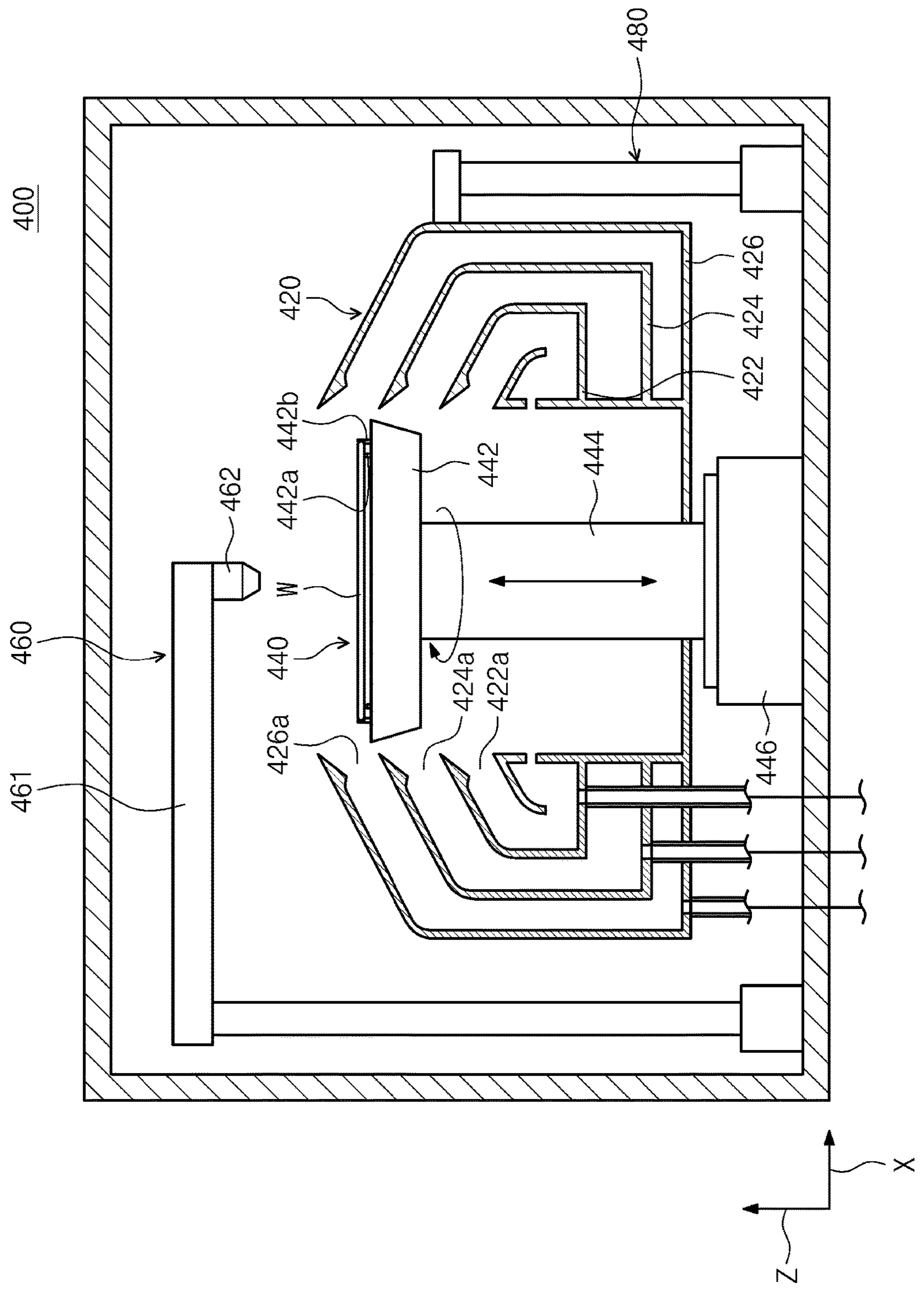
FIG. 3 is a schematic view illustrating one embodiment of liquid treatment chambers of FIG. 2.

FIG. 3 is a schematic view illustrating one embodiment of the liquid treatment chambers of FIG. 2. Referring to FIG.

3, the liquid treatment chamber 400 has a housing 410, a cup 420, a support unit 440, a liquid dispensing unit 460, and a lifting unit 480.

The housing 410 may have an inner space in which a substrate W is treated. The housing 410 may have a hexahedral shape. For example, the housing 410 may have a rectangular parallelepiped shape. The housing 410 may have an opening (not illustrated) through which the substrate W enters or exits the housing 410. The housing 410 may be equipped with a door (not illustrated) that selectively opens and closes the opening.

The cup 420 may have a container shape that is open at the top. The cup 420 may have a process space, and the substrate W may be treated with liquids in the process space. The support unit 440 supports the substrate W in the process space. The liquid dispensing unit 460 dispenses the liquids onto the substrate W supported on the support unit 440. The liquids may be sequentially dispensed onto the substrate W. The lifting unit 480 adjusts the relative height between the cup 420 and the support unit 440.

According to an embodiment, the cup 420 has a plurality of recovery bowls 422, 424, and 426. The recovery bowls 422, 424, and 426 have recovery spaces for recovering the liquids used to treat the substrate W. The recovery bowls 422, 424, and 426 have a ring shape surrounding the support unit 440. The liquids scattered by rotation of the substrate W during a liquid treatment process are introduced into the recovery spaces through inlets 422*a*, 424*a*, and 426*a* of the respective recovery bowls 422, 424, and 426. According to an embodiment, the cup 420 has the first recovery bowl 422, the second recovery bowl 424, and the third recovery bowl 426. The first recovery bowl 422 is disposed to surround the support unit 440, the second recovery bowl 424 is disposed to surround the first recovery bowl 422, and the third recovery bowl 426 is disposed to surround the second recovery bowl 424. The second inlet 424*a* through which a liquid is introduced into the second recovery bowl 424 may be located in a higher position than the first inlet 422*a* through which a liquid is introduced into the first recovery bowl 422, and the third inlet 426*a* through which a liquid is introduced into the third recovery bowl 426 may be located in a higher position than the second inlet 424*a*.

The support unit 440 has a support plate 442 and a drive shaft 444. An upper surface of the support plate 442 may have a substantially circular shape and may have a larger diameter than the substrate W. Support pins 442*a* are provided on a central portion of the support plate 442 to support a rear surface of the substrate W. The support pins 442*a* protrude upward from the support plate 442 to space the substrate W apart from the support plate 442 by a predetermined distance. Chuck pins 442*b* are provided on an edge portion of the support plate 442. The chuck pins 442*b* protrude upward from the support plate 442 and support a lateral portion of the substrate W to prevent the substrate W from deviating from the support unit 440 when the substrate W is rotated. The drive shaft 444 is driven by an actuator 446. The drive shaft 444 is connected to the center of a rear surface of the support plate 442 and rotates the support plate 442 about the central axis thereof.

According to an embodiment, the liquid dispensing unit 460 may include a nozzle 462. The nozzle 462 may dispense a treatment liquid onto the substrate W. The treatment liquid may be a chemical, a rinsing solution, or an organic solvent. The chemical may be a chemical having a property of strong acid or strong base. The rinsing solution may be deionized water. The organic solvent may be isopropyl alcohol (IPA). The liquid dispensing unit 460 may include a plurality of nozzles 462, and the nozzles 462 may dispense different types of treatment liquids. For example, one of the nozzles 462 may dispense the chemical, another nozzle 462 may dispense the rinsing solution, and another nozzle 462 may dispense the organic solvent. The controller 30 may control the liquid dispensing unit 460 to dispense the organic solvent onto the substrate W after dispensing the rinsing solution onto the substrate W. Accordingly, the rinsing solution dispensed onto the substrate W may be replaced with the organic solvent having low surface tension.

The lifting unit 480 moves the cup 420 in the up/down direction. The height of the cup 420 relative to the substrate W is changed by the movement of the cup 420 in the up/down direction. Accordingly, the recovery bowls 422, 424, and 426 for recovering the treatment liquids may be changed depending on the types of liquids dispensed onto the substrate W, thereby separating and recovering the liquids. Alternatively, the cup 420 may be fixed, and the lifting unit 480 may move the support unit 440 in the up/down direction.

Figure 4:
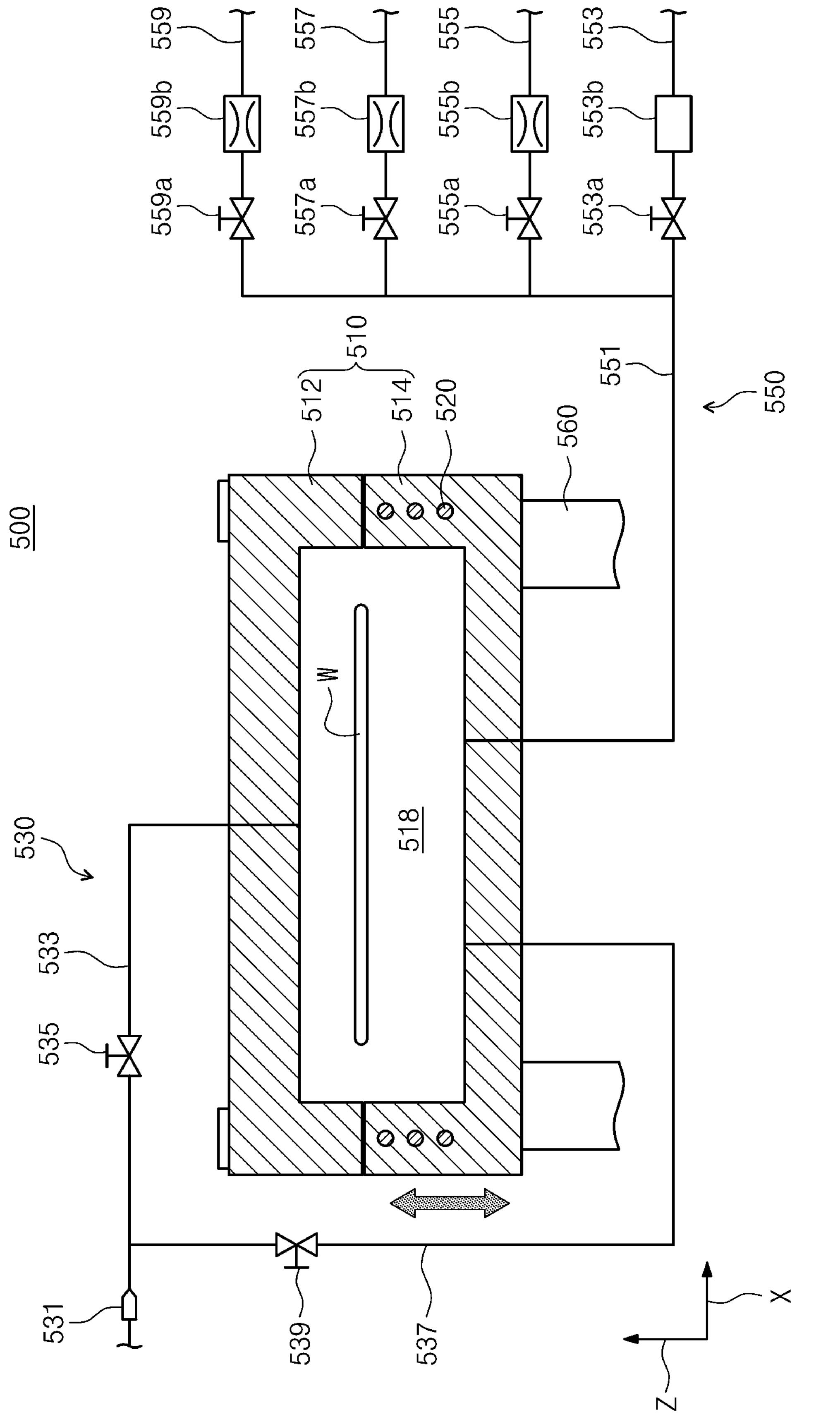
FIG. 4 is a schematic view illustrating one embodiment of drying chambers of FIG. 2.

FIG. 4 is a schematic view illustrating one embodiment of the drying chambers of FIG. 2. Referring to FIG. 4, a drying chamber 500 according to an embodiment of the inventive concept may remove a treatment liquid remaining on a substrate W using a drying fluid G in a supercritical state. For example, the drying chamber 500 may perform a drying process of removing an organic solvent remaining on the substrate W using carbon dioxide ($CO_2$) in a supercritical state.

The drying chamber 500 may include a body 510, a heating member 520, the fluid supply unit 530, the fluid exhaust unit 550, and a lifting member 560. The body 510 may have an inner space 518 in which the substrate W is treated. The body 510 may provide the inner space 518 in which the substrate W is treated. The body 510 may provide the inner space 518 in which the substrate W is dried by the drying fluid G in the supercritical state.

The body 510 may include an upper body 512 and a lower body 514. The upper body 512 and the lower body 514 may be combined with each other to form the inner space 518. The substrate W may be supported in the inner space 518. For example, the substrate W may be supported by a support member (not illustrated) in the inner space 518. The support member may be configured to support a lower surface of an edge region of the substrate W. One of the upper body 512 and the lower body 514 may be coupled with the lifting member 560 and may be moved in the up/down direction by the lifting member 560. For example, the lower body 514 may be coupled with the lifting member 560 and may be moved in the up/down direction by the lifting member 560. Accordingly, the inner space 518 of the body 510 may be selectively sealed. Although it has been illustrated that the lower body 514 is coupled with the lifting member 560 and moved in the up/down direction by the lifting member 560, the inventive concept is not limited thereto. For example, the upper body 512 may be coupled with the lifting member 560 and may be moved in the up/down direction by the lifting member 560.

The heating member 520 may heat the drying fluid G supplied into the inner space 518. The heating member 520 may raise the temperature in the inner space 518 of the body 510 to cause the drying fluid G supplied into the inner space 518 to experience a phase change into a supercritical state. Furthermore, the heating member 520 may raise the temperature in the inner space 518 of the body 510 to cause the drying fluid G in the supercritical state supplied into the inner space 518 to remain in the supercritical state.

Furthermore, the heating member 520 may be buried in the body 510. For example, the heating member 520 may be buried in one of the upper body 512 and the lower body 514. For example, the heating member 520 may be provided in the lower body 514. However, without being limited thereto, the heating member 520 may be provided in various positions to raise the temperature in the inner space 518. The heating member 520 may be a heater. However, without being limited thereto, the heating member 520 may be implemented with various well-known devices capable of raising the temperature in the inner space 518.

The fluid supply unit 530 may supply the drying fluid G into the inner space 518 of the body 510. The drying fluid G supplied by the fluid supply unit 530 may include carbon dioxide ($CO_2$). The fluid supply unit 530 may include a fluid supply source 531, a first supply line 533, a first supply valve 535, a second supply line 537, and a second supply valve 539.

The fluid supply source 531 may store the drying fluid G to be supplied into the inner space 518 of the body 510 and/or may supply the drying fluid G into the inner space 518 of the body 510. The fluid supply source 531 may supply the drying fluid G to the first supply line 533 and/or the second supply line 537. For example, the first supply valve 535 may be disposed in-line with the first supply line 533. Furthermore, the second supply valve 539 may be disposed in-line with the second supply line 537. The first supply valve 535 and the second supply valve 539 may be on/off valves. The drying fluid G may selectively flow through the first supply line 533 or the second supply line 327 as the first supply valve 535 and the second supply valve 539 are turned on/off.

Although it has been illustrated that the first supply line 533 and the second supply line 537 are connected to the one fluid supply source 531, the inventive concept is not limited thereto. For example, a plurality of fluid supply sources 531 may be provided. The first supply line 533 may be connected with one of the plurality of fluid supply sources 531, and the second supply line 537 may be connected with another one of the fluid supply sources 531.

The first supply line 533 may be an upper supply line that supplies the drying fluid G from above the inner space 518 of the body 510. For example, the first supply line 533 may supply the drying fluid G into the inner space 518 of the body 510 in a downward direction. For example, the first supply line 533 may be connected to the upper body 512. Furthermore, the second supply line 537 may be a lower supply line that supplies the drying fluid G from below the inner space 518 of the body 510. For example, the second supply line 537 may supply the drying fluid G into the inner space 518 of the body 510 in an upward direction. For example, the second supply line 537 may be connected to the lower body 514.

The fluid exhaust unit 550 may release the drying fluid G from the inner space 518 of the body 510. The fluid exhaust unit 550 may include a main exhaust line 551, a flow line 553, a slow vent line 555, a quick vent line 557, and a pulse vent line 559.

The main exhaust line 551 may be connected with the body 510. The main exhaust line 551 may release the drying fluid G supplied into the inner space 518 of the body 510 to the outside of the body 510. For example, one end of the main exhaust line 551 may be connected with the body 510. The one end of the main exhaust line 551 may be connected with one of the upper body 512 and the lower body 514. For example, the one end of the main exhaust line 551 may be connected with the lower body 514. Furthermore, an opposite end of the main exhaust line 551 may branch. For example, the opposite end of the main exhaust line 551 may branch. Lines into which the main exhaust line 551 branches may include the flow line 553, the slow vent line 555, the quick vent line 557, and the pulse vent line 559.

The flow line 553 may branch from the opposite end of the main exhaust line 551. A first exhaust valve **553*a* and a pressure adjustment member 553*b* may be disposed in-line with the flow line 553. The first exhaust valve 553*a* may be installed upstream of the pressure adjustment member 553*b*. The first exhaust valve 553*a* may be an on/off valve. The first exhaust valve 553*a* may cause the drying fluid G to selectively flow through the flow line 553. Furthermore, the flow line 553** may be used in flow step S33 that will be described below.

The pressure adjustment member **553*b* may maintain the pressure in the inner space 518 of the body 510 at a set pressure. For example, the pressure adjustment member 553*b* may measure the pressure of the drying fluid G flowing through the main exhaust line 551. Furthermore, the pressure adjustment member 553*b* may measure the pressure in the inner space 518 of the body 510, based on the pressure of the drying fluid G flowing through the main exhaust line 551. Moreover, to maintain the pressure in the inner space 518 of the body 510 at the set pressure, the pressure adjustment member 553*b* may adjust the amount of the drying fluid G released per unit time through the flow line 553. For example, the pressure adjustment member 553*b* may be a back pressure regulator (BRP). For example, when it is assumed that the set pressure for the inner space 518 of the body 510 is 150 Bar, the pressure adjustment member 553*b* may prevent the drying fluid G from being released through the flow line 553, until the pressure in the inner space 518 of the body 510 reaches the set pressure of 150 Bar. Furthermore, when the pressure in the inner space 518 of the body 510 reaches a pressure (e.g., 170 Bar) higher than the set pressure, the pressure adjustment member 553*b* may release the drying fluid G through the flow line 553 to lower the pressure in the inner space 518 of the body 510** to 150 Bar.

The slow vent line 555 may branch from the opposite end of the main exhaust line 551. The slow vent line 555 may lower the pressure in the inner space 518 of the body 510. The slow vent line 555 may be used in first vent step S34 that will be described below. A second exhaust valve **555*a* and a slow vent line orifice 555*b* may be disposed in-line with the slow vent line 555. The second exhaust valve 555*a* may be installed upstream of the slow vent line orifice 555*b*. The second exhaust valve 555*a* may be an on/off valve. Furthermore, the hydraulic diameter of the slow vent line orifice 555*b* may be smaller than the hydraulic diameter of a quick vent line orifice 557*b*** that will be described below.

The quick vent line 557 may branch from the opposite end of the main exhaust line 551. The quick vent line 557 may lower the pressure in the inner space 518 of the body 510. The quick vent line 557 may be used in second vent step S35 that will be described below. A third exhaust valve **557*a* and the quick vent line orifice 557*b* may be disposed in-line with the quick vent line 557. The third exhaust valve 557*a* may be installed upstream of the quick vent line orifice 557*b*. The third exhaust valve 557*a* may be an on/off valve. Furthermore, the hydraulic diameter of the quick vent line orifice 557*b* may be greater than the hydraulic diameter of the slow vent line orifice 555*b*** that will be described below.

The pulse vent line 559 may branch from the opposite end of the main exhaust line 551. The pulse vent line 559 may repeatedly change the pressure in the inner space 518 of the body 510. For example, a fourth exhaust valve 559*a* and a pulse vent line orifice 559*b* may be disposed in-line with the pulse vent line 559. The fourth exhaust valve 559*a* may be an on/off valve. The above-described controller 30 may raise/lower the pressure in the inner space 518 of the body 510 by repeatedly turning on/off the fourth exhaust valve 559*a*. That is, the pressure in the inner space 518 of the body 510 may be repeatedly raised and lowered by turning on/off the fourth exhaust valve 559*a*. Furthermore, the pulse vent line 559 may be used in flow step S33 that will be described below. In flow step S33 to be described below, the controller 30 may turn on/off the first exhaust valve 553*a* or the fourth exhaust valve 559*a* to release the drying fluid G in the inner space 518 of the body 510 through a selected one of the flow line 553 and the pulse vent line 559.

Hereinafter, a substrate treating method according to an embodiment of the inventive concept will be described. The substrate treating method to be described below may be performed by the substrate treating apparatus. The controller 30 may control the substrate treating apparatus to perform the substrate treating method to be described below.

Figure 5:
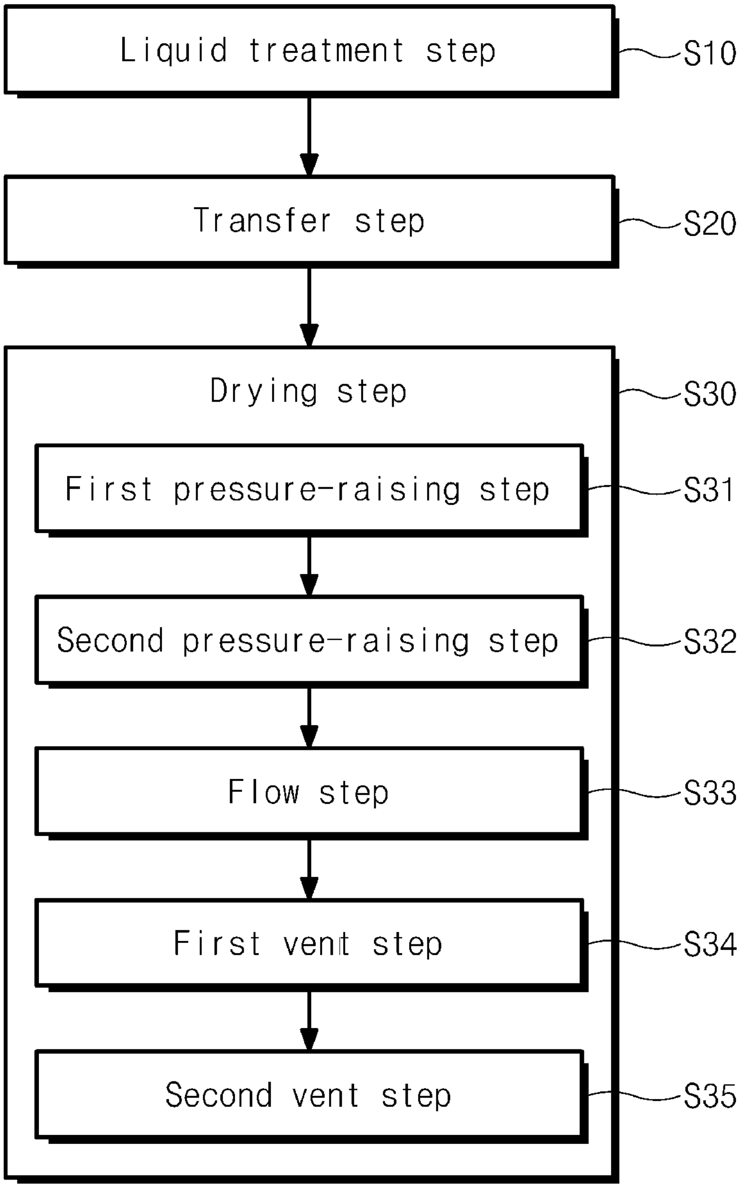
FIG. 5 is a flowchart illustrating a substrate treating method according to an embodiment of the inventive concept.

FIG. 5 is a flowchart illustrating the substrate treating method according to the embodiment of the inventive concept. Referring to FIG. 5, the substrate treating method according to the embodiment of the inventive concept may include liquid treatment step S10, transfer step S20, and drying step S30.

Figure 6:
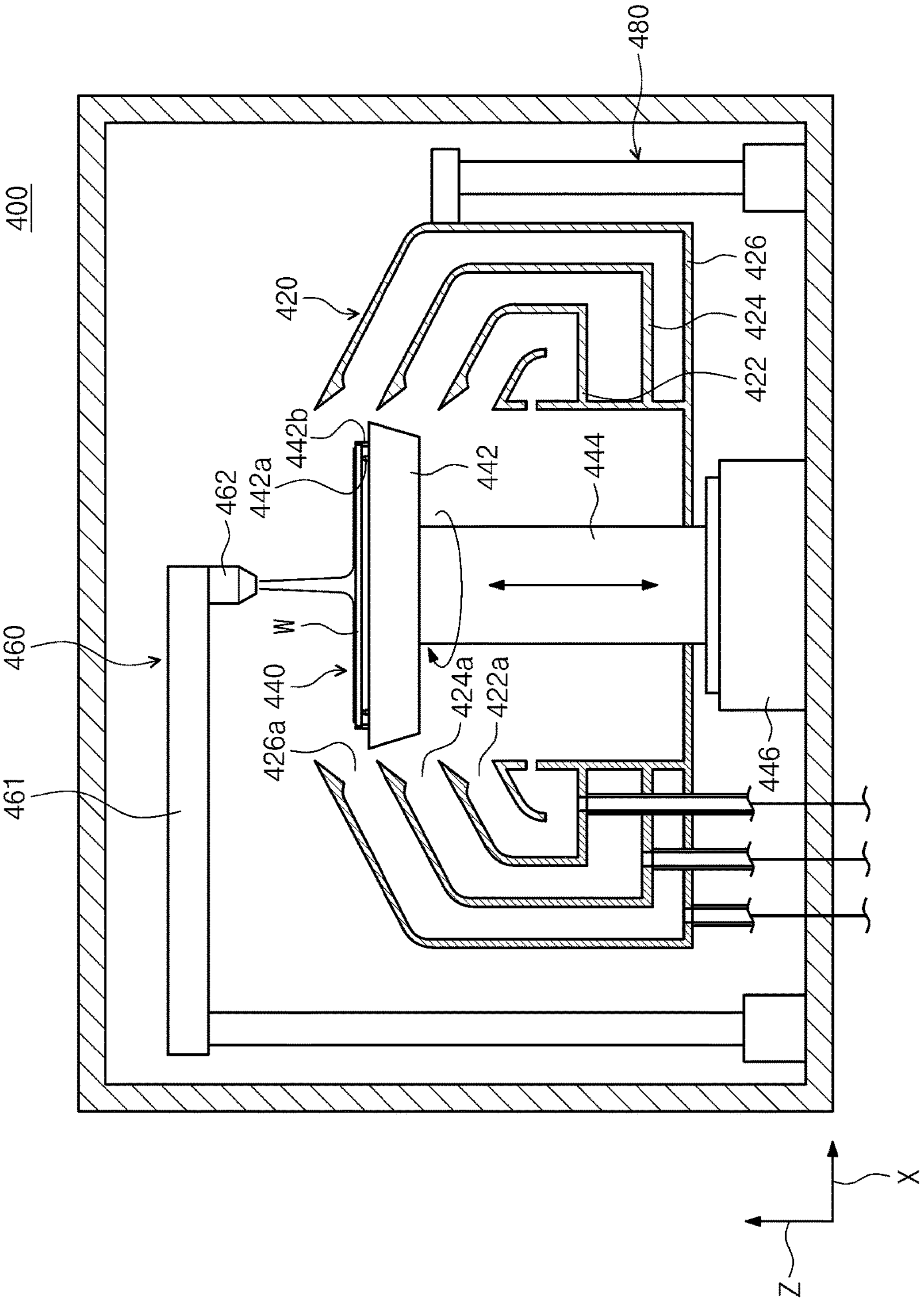
FIG. 6 is a view illustrating a liquid treatment chamber performing a liquid treatment step of FIG. 5.

Liquid treatment step S10 is a step of performing liquid treatment on a substrate W by dispensing a treatment liquid onto the substrate W. The liquid treatment step S10 may be performed in the liquid treatment chamber 400. For example, in liquid treatment step S10, the treatment liquid may be dispensed onto the rotating substrate W to perform liquid treatment on the substrate W (refer to FIG. 6). The treatment liquid dispensed in liquid treatment step S10 may be at least one of the chemical, the rinsing solution, or the organic solvent described above. For example, in liquid treatment step S10, the rinsing solution may be dispensed onto the rotating substrate W to rinse the substrate W. Thereafter, the organic solvent may be dispensed onto the rotating substrate W, and the rinsing solution remaining on the substrate W may be replaced with the organic solvent.

Transfer step S20 is a step of transferring the substrate W. Transfer step S20 may be a step of transferring the substrate W subjected to the liquid treatment to the drying chamber 500. For example, in transfer step S20, the transfer robot 320 may transfer the substrate W from the liquid treatment chamber 400 to the drying chamber 500. The treatment liquid may remain on the substrate W transferred in transfer step S20. For example, the organic solvent may remain on the substrate W. That is, the substrate W drenched in the organic solvent may be transferred to the drying chamber 500.

Drying step S30 is a step of drying the substrate W. Drying step S30 may be performed in the drying chamber 500. In drying step S30, the drying fluid G may be supplied to the substrate W in the inner space 518 of the body 510 to dry the substrate W. The drying fluid G supplied to the substrate W in drying step S30 may be in a supercritical state.

Drying step S30 may include pressure-raising steps S31 and S32, flow step S33, and vent steps S34 and S35. Pressure-raising steps S31 and S32 may be steps of raising the pressure in the inner space 518 of the body 510 to the set pressure.

Flow step S33 may be performed after pressure-raising steps S31 and S32. Flow step S33 may be a step of generating a flow of the drying fluid G in the supercritical state that is supplied into the inner space 518 of the body 510.

Vent steps S34 and S35 may be performed after flow step S33. In vent steps S34 and S35, the pressure in the inner space 518 of the body 510 may be lowered. For example, in vent steps S34 and S35, the pressure in the inner space 518 of the body 510 may be lowered to the atmospheric pressure.

Hereinafter, pressure-raising steps S31 and S32, flow step S33, and vent steps S34 and S35 will be described in more detail.

Pressure-raising steps S31 and S32 may include first pressure-raising step S31 and second pressure-raising step S32.

Figure 7:
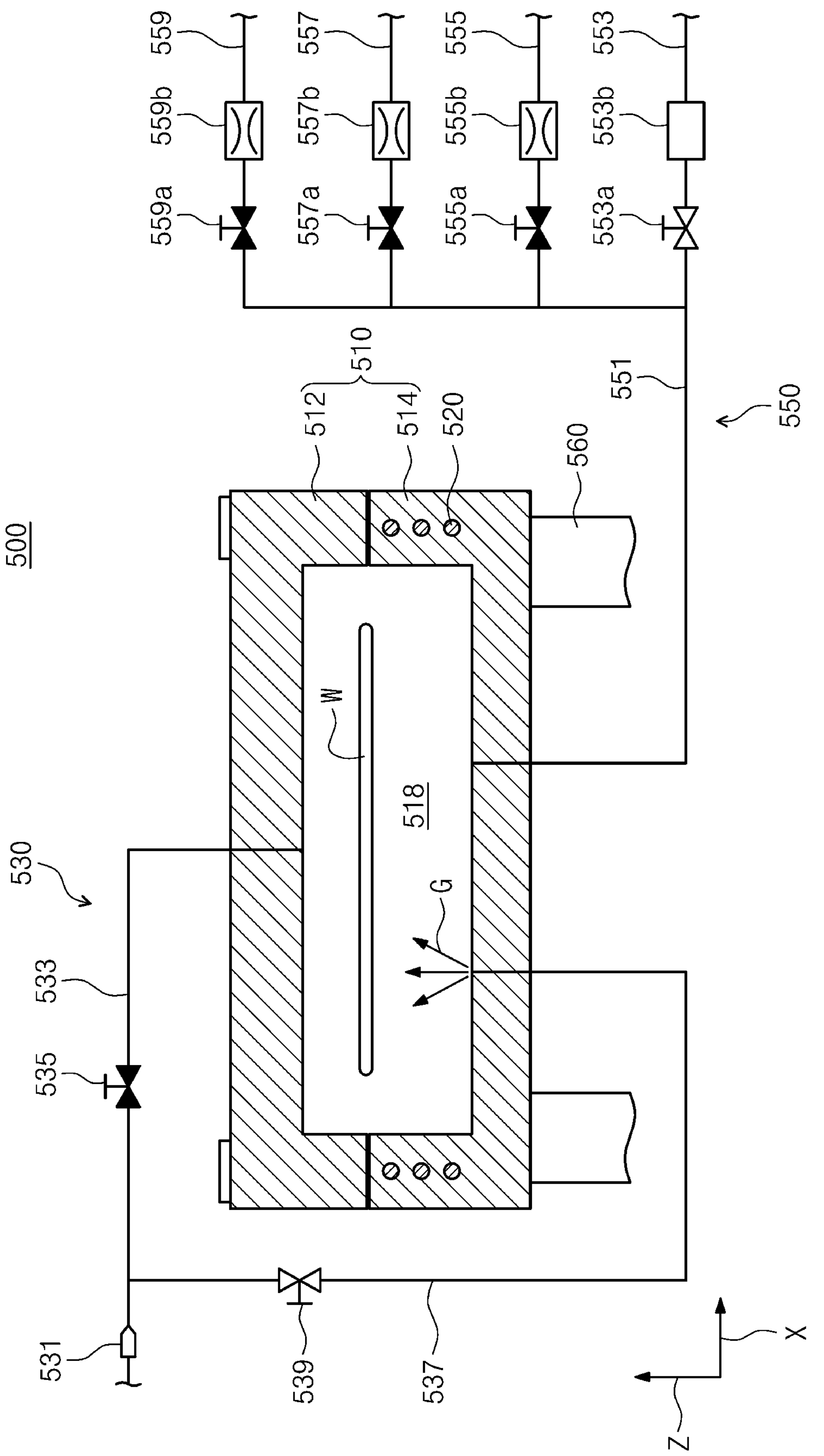
FIG. 7 is a view illustrating a drying chamber performing a first pressure-raising step of FIG. 5.

In first pressure-raising step S31, the second supply line 537 may supply the drying fluid G into the inner space 518 of the body 510 (refer to FIG. 7). That is, in first pressure-raising step S31, the drying fluid G may be supplied into a lower portion of the inner space 518 of the body 510, specifically, below the substrate W supported in the inner space 518. In first pressure-raising step S31, the pressure in the inner space 518 of the body 510 may be raised to a second set pressure P2. The second set pressure P2 may be 120 Bar. Furthermore, the first exhaust valve 553 *a* may remain turned on while first pressure-raising step S31 is performed. Because the pressure in the inner space 518 of the body 510 does not reach a desired pressure (e.g., a second pressure P2) in first pressure-raising step S31, the pressure adjustment member 553 *b* may not allow the drying fluid G to flow through the flow line 553 even though the first exhaust valve 553 *a* is turned on.

Figure 8:
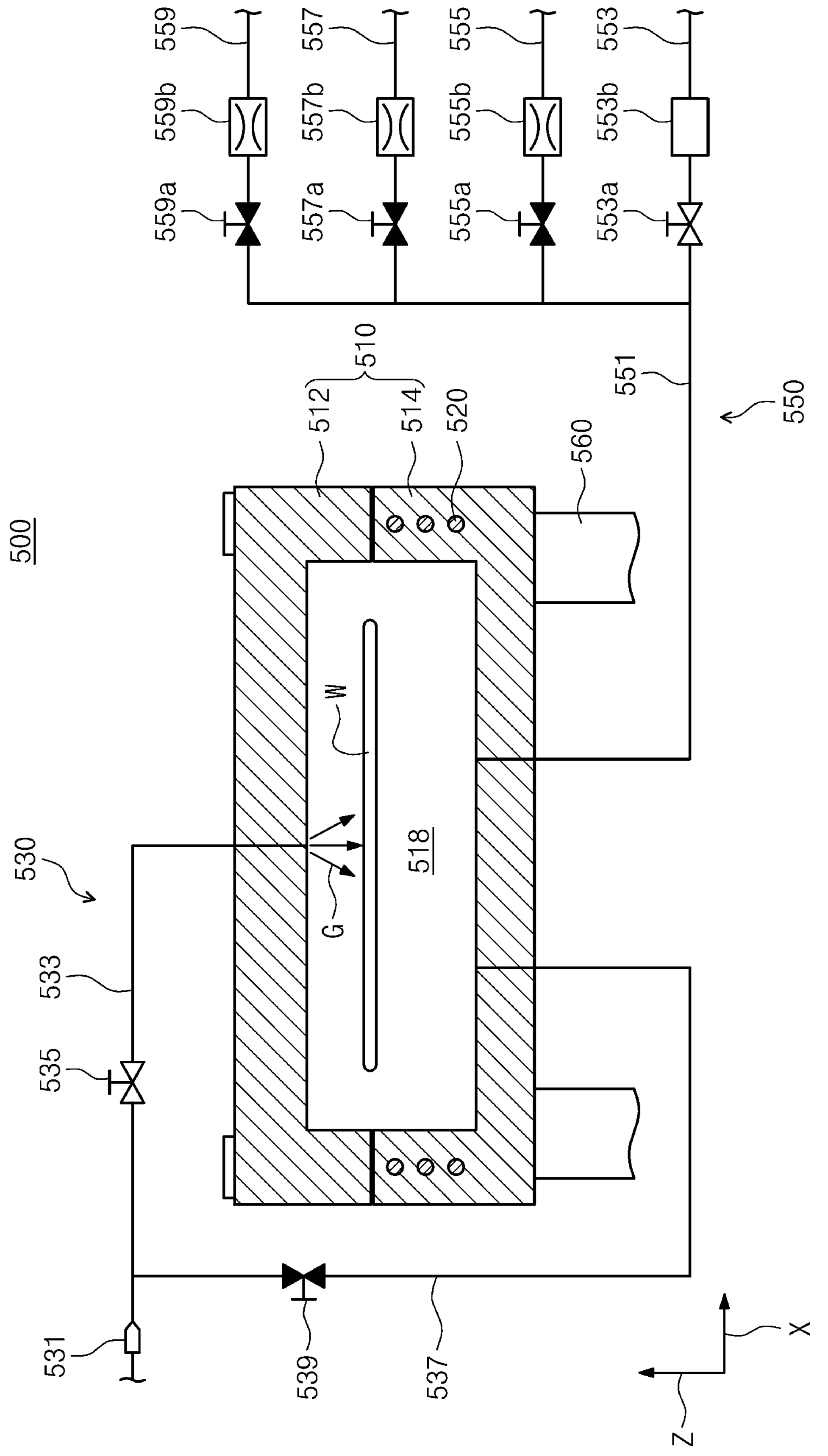
FIG. 8 is a view illustrating the drying chamber performing a second pressure-raising step of FIG. 5.

In second pressure-raising step S32, the first supply line 533 may supply the drying fluid G into the inner space 518 of the body 510 (refer to FIG. 8). That is, in second pressure-raising step S32, the drying fluid G may be supplied into an upper portion of the inner space 518, specifically, above the substrate W supported in the inner space 518. In second pressure-raising step S32, the pressure in the inner space 518 of the body 510 may be raised to a first set pressure P1. The first set pressure P1 may be 150 Bar. Furthermore, the first exhaust valve 553*a* may remain turned on while second pressure-raising step S32 is performed. Because the pressure in the inner space 518 of the body 510 does not reach the desired pressure (e.g., the second pressure P2) in second pressure-raising step S32, the pressure adjustment member 553*b* may not allow the drying fluid G to flow through the flow line 553 even though the first exhaust valve 553*a* is turned on.

Although it has been illustrated that the first supply line 533 supplies the drying fluid G in second pressure-raising step S32, the inventive concept is not limited thereto. For example, in second pressure-raising step S32, the second supply line 537 may supply the drying fluid G. Alternatively, both the first supply line 533 and the second supply line 537 may supply the drying fluid G.

While pressure-raising steps S31 and S32 are performed, the pressure in the inner space 518 may reach the desired pressure. While pressure-raising steps S31 and S32 are performed, the inner space 518 may be heated by the heating member 520. Accordingly, the drying fluid G supplied into the inner space 518 may experience a phase change into a supercritical state. However, without being limited thereto, the drying fluid G may be supplied into the inner space 518 in a supercritical state. In this case, the pressure in the inner space 518 may reach a desired pressure (e.g., the first set pressure P1) in pressure-raising steps S31 and S32, and thus the drying fluid G supplied into the inner space 518 in the supercritical state may remain in the supercritical state.

Figure 9:
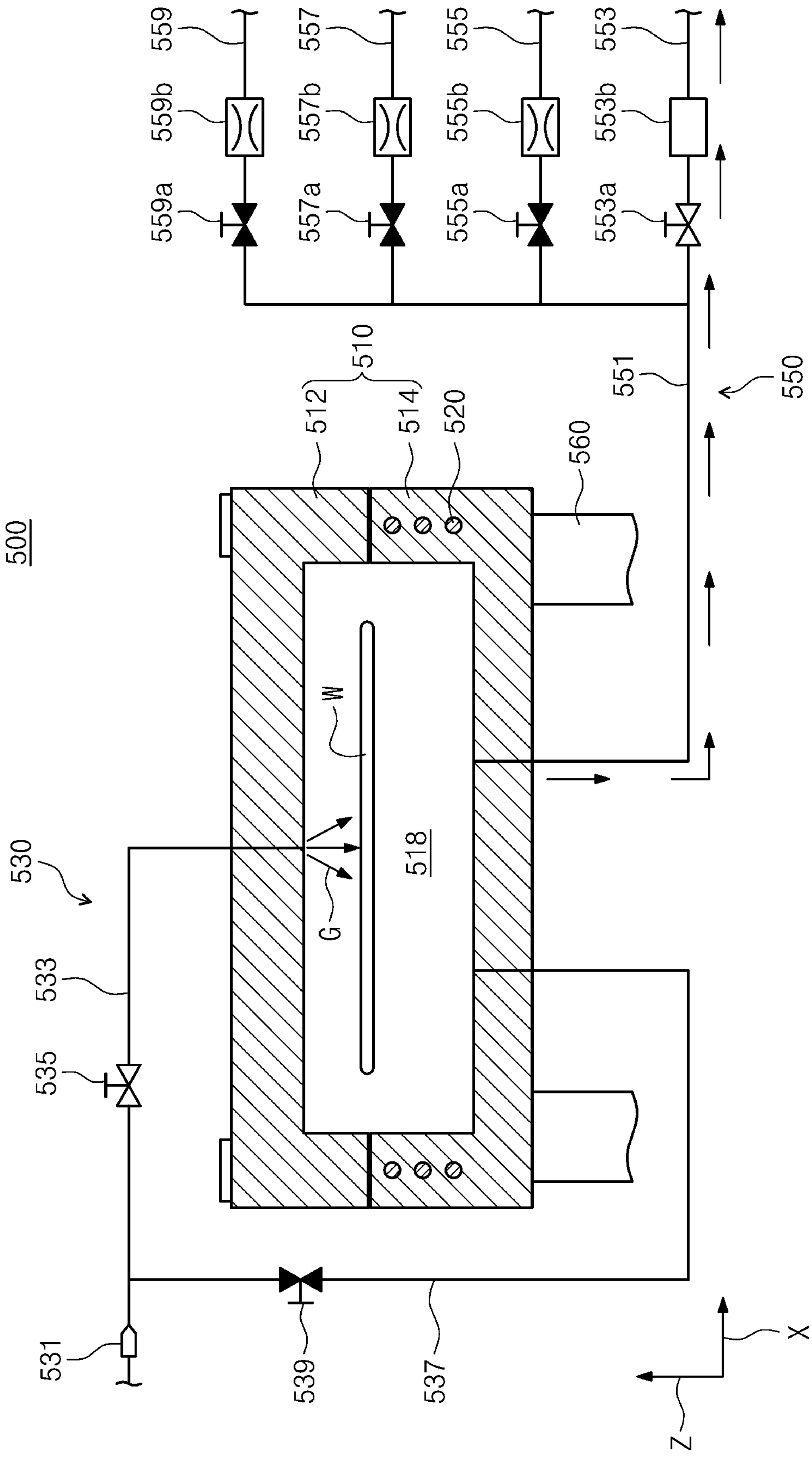
FIG. 9 is a view illustrating the drying chamber performing a flow step of FIG. 5.

In flow step S33, a flow of the drying fluid G in the supercritical state that is supplied into the inner space 518 may be generated. In flow step S33, the flow line 553 may continually release the drying fluid G at the same time that the first supply line 533 continually supplies the drying fluid G (refer to FIG. 9). That is, in flow step S33, the fluid exhaust unit 550 may continually release the drying fluid G from the inner space 518 while the fluid supply unit 530 supplies the drying fluid G into the inner space 518. Furthermore, in flow step S33, the first exhaust valve 553*a* may remain turned on. In addition, in flow step S33, the second exhaust valve 555*a*, the third exhaust valve 557*a*, and the fourth exhaust valve 559*a* may remain turned off.

To maintain the pressure in the inner space 518 at the first set pressure P1 (e.g., 150 Bar), the pressure adjustment member 553*b* adjusts the amount of the drying fluid G flowing through the flow line 553 per unit time. Accordingly, the amount of the drying fluid G supplied by the first supply line 533 of the fluid supply unit 530 per unit time may be the same as the amount of the drying fluid G released by the fluid exhaust unit 550 through the flow line 553 per unit time. That is, in flow step S33, the first supply line 533 may continually supply the drying fluid G, and the flow line 553 may continually release the drying fluid G. Accordingly, a flow of the drying fluid G in the inner space 518 may be generated.

Figure 10:
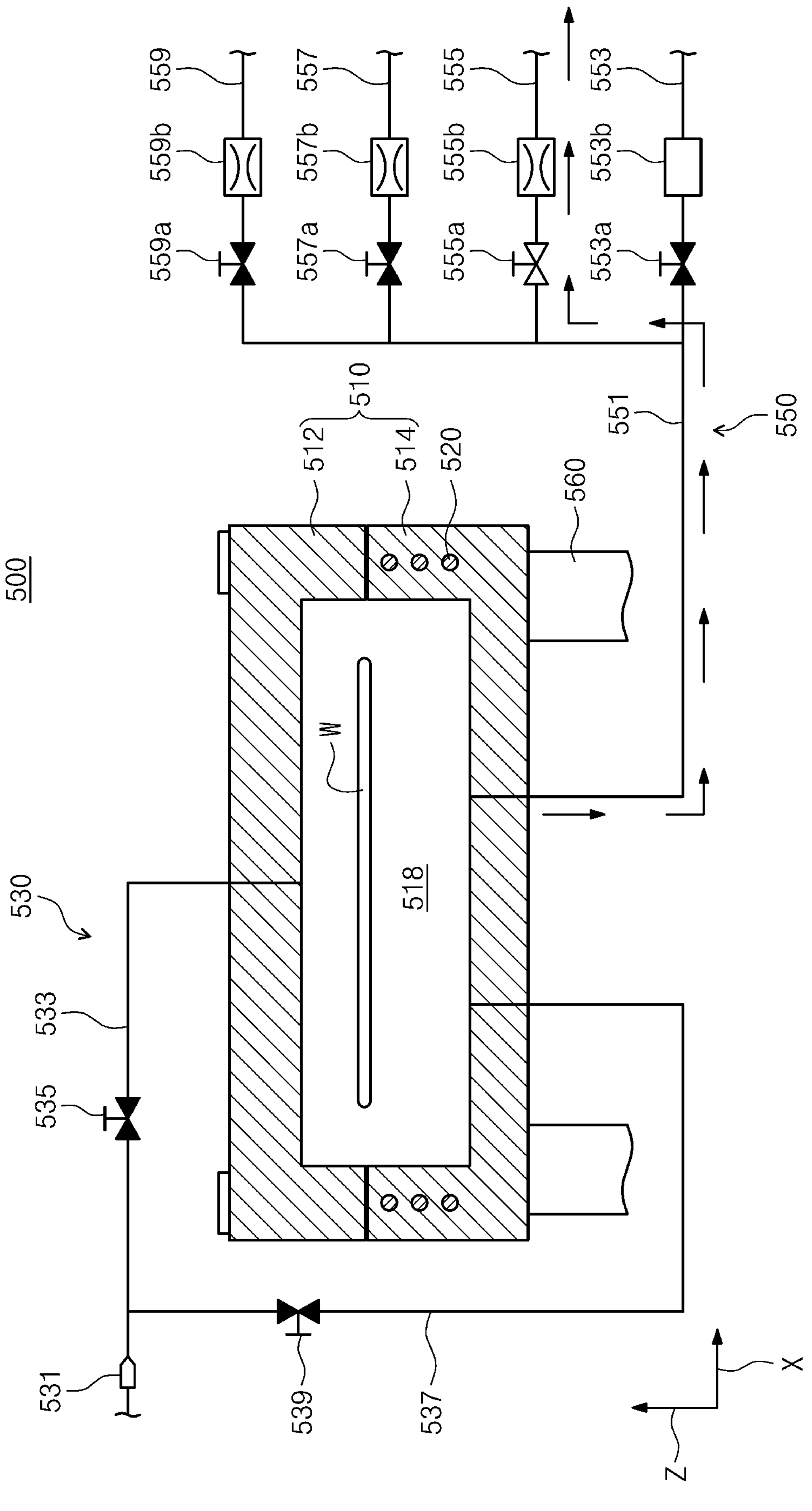
FIG. 10 is a view illustrating the drying chamber performing a first vent step of FIG. 5.

In first vent step S34, the drying fluid G may be released through the slow vent line 555, and the fluid supply unit 530 may stop supplying the drying fluid G (refer to FIG. 10). Accordingly, the pressure in the inner space 518 may be lowered. Furthermore, in first vent step S34, the second exhaust valve 555*a* may be turned on and may remain turned on. In addition, in first vent step S34, the first exhaust valve 553*a*, the third exhaust valve 557*a*, and the fourth exhaust valve 559*a* may remain turned off.

Figure 11:
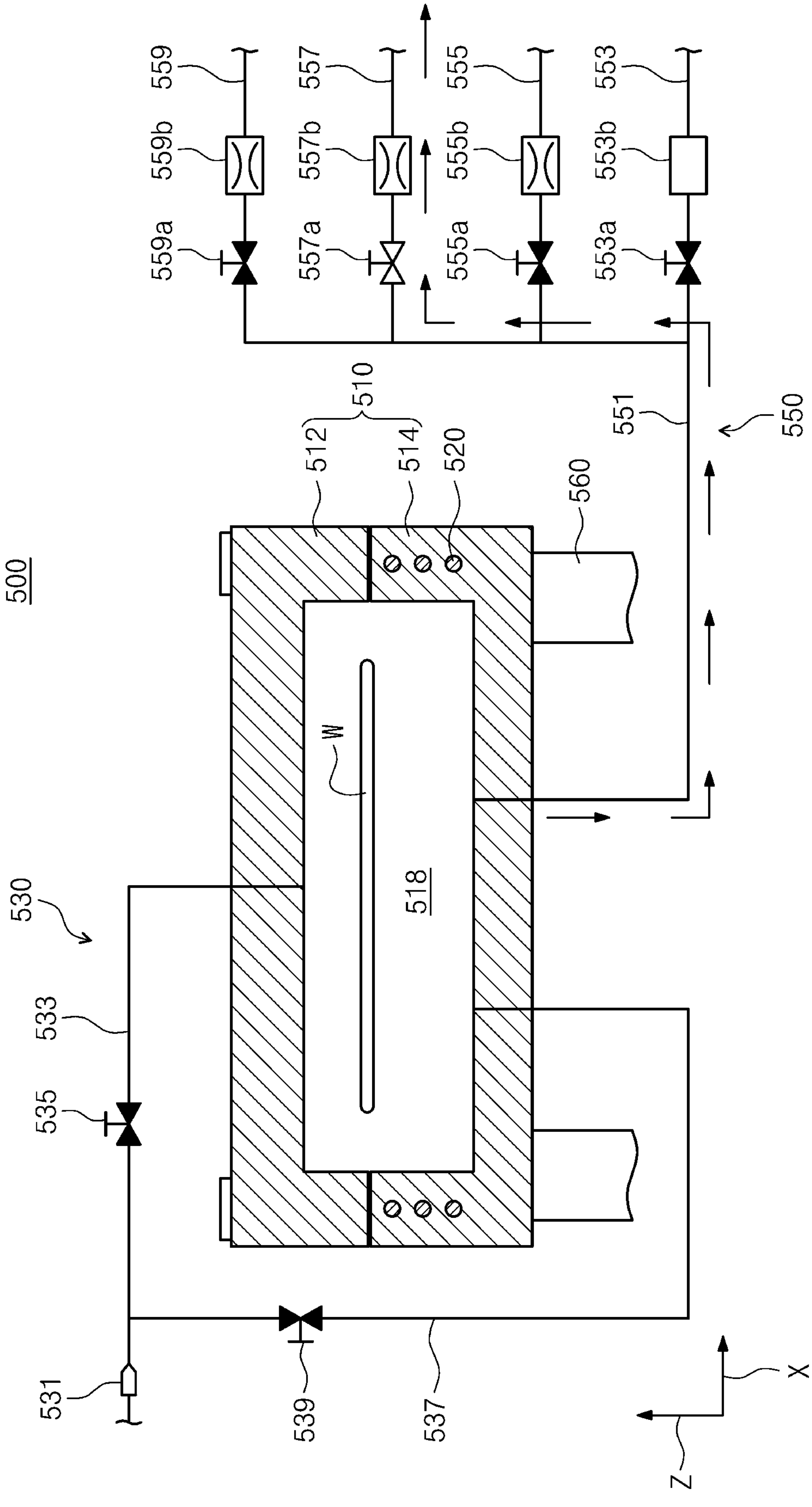
FIG. 11 is a view illustrating the drying chamber performing a second vent step of FIG. 5.

In second vent step S35, the drying fluid G may be released through the quick vent line 557, and the fluid supply unit 530 may stop supplying the drying fluid G (refer to FIG. 11). Accordingly, the pressure in the inner space 518 may be lowered. Furthermore, in second vent step S35, the third exhaust valve 557*a* may be turned on and may remain turned on. In addition, in second vent step S35, the first exhaust valve 553*a*, the second exhaust valve 555*a*, and the fourth exhaust valve 559*a* may remain turned off.

Because the hydraulic diameter of the slow vent line orifice 555*b* is smaller than the hydraulic diameter of the quick vent line orifice 557*b* as described above, the decompression rate in first vent step S34 may be lower than the decompression rate in second vent step S35.

Figure 12:
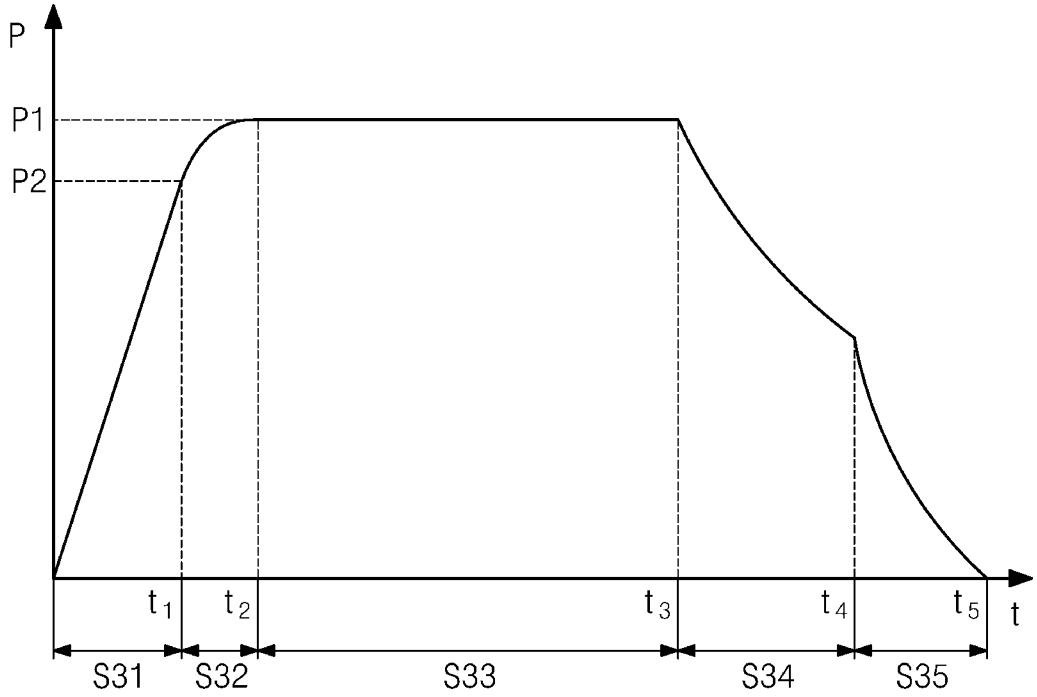
FIG. 12 is a view illustrating a pressure change in an inner space of a body while a drying process of the inventive concept is performed.

FIG. 12 is a view illustrating a pressure change in the inner space of the body while a drying process of the inventive concept is performed. Referring to FIG. 12, in first press-raising step S31, the pressure in the inner space 518 may be raised to the second set pressure P2. The second set pressure P2 may be about 120 Bar. In second pressure-raising step S32, the pressure in the inner space 518 may be raised to the first set pressure P1. The first set pressure P1 may be about 150 Bar. In flow step S33, the pressure in the inner space 518 may be maintained at the first set pressure P1. In first vent step S34, the pressure in the inner space 518 may be slowly lowered, and in second vent step S35, the pressure in the inner space 518 may be rapidly lowered.

Hereinafter, effects of the inventive concept will be described in detail.

The following table shows the process time and the number of particles remaining on a substrate W when flow step S33 is performed in the conventional pulse manner using the pulse vent line 559 and when flow step S33 is performed in the continuous manner using the flow line 553. Pressure-raising steps S31 and S32 and vent steps S34 and S35 were performed for the same time. Furthermore, the amounts of organic solvents remaining on substrates W were the same.

TABLE 1

| | Time spent performing flow step S33 | Process No. | Number of particles |
|---|---|---|---|
| Pulse manner | 65 seconds | 1 | 501 |
| | | 2 | 458 |
| | | 3 | 436 |
| Continuous manner | 40 seconds | 1 | 167 |
| | | 2 | 183 |
| | | 3 | 178 |
| Continuous manner | 33 seconds | 1 | 148 |
| | | 2 | 143 |
| | | 3 | 167 |
| Continuous manner | 25 seconds | 1 | 306 |
| | | 2 | 195 |
| | | 3 | 188 |
| Continuous manner | 20 seconds | 1 | 227 |
| | | 2 | 174 |
| | | 3 | 175 |

Through the table above, it can be seen that when flow step S33 is performed by using the continuous manner of the inventive concept, even though the set time to perform flow step S33 is reduced, the number of particles remaining on a substrate W is equal to or smaller than that when flow step S33 is performed by using the conventional pulse manner. That is, according to the embodiment of the inventive concept, the number of particles remaining on a substrate W may be maintained at the same or lower level while time spent treating the substrate W is reduced. As can be seen from the experimental data, the set time (t2 to t3) during which flow step S33 is performed may range from 20 seconds to 65 seconds, preferably from 25 seconds to 65 seconds. For example, flow step S33 may be performed for 33 seconds or 40 seconds showing a low particle level.

In the inventive concept, the pressure in the inner space 518 in flow step S33 may be maintained in the range of 120 Bar to 150 Bar. For example, the pressure in the inner space 518 in flow step S33 may be maintained at about 150 Bar.

Figure 13:
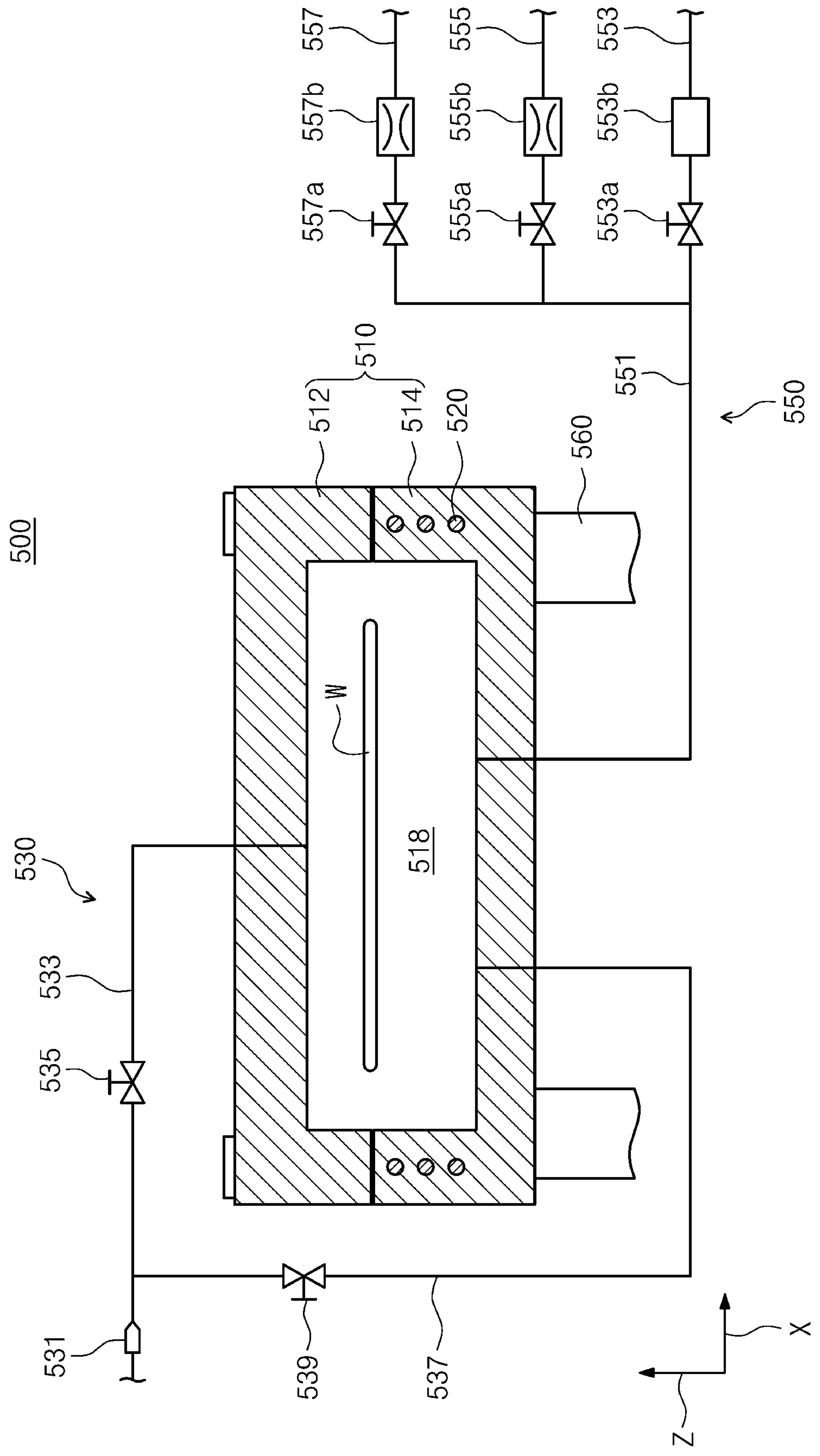
FIG. 13 is a schematic view illustrating a drying chamber according to another embodiment of the inventive concept.
Figure 14:
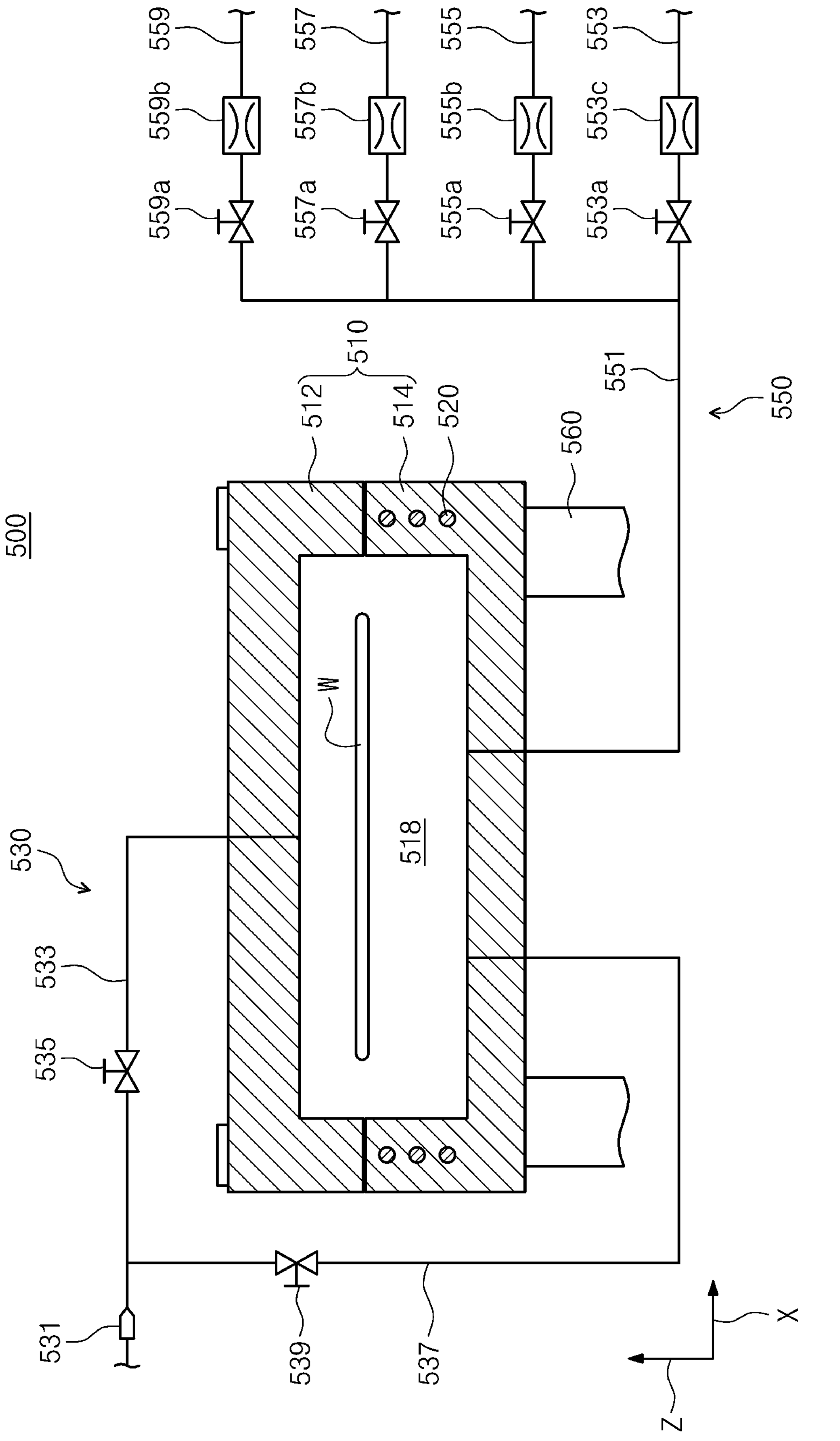
FIG. 14 is a schematic view illustrating a drying chamber according to another embodiment of the inventive concept.

Although it has been illustrated that the fluid exhaust unit 550 includes the pulse vent line 559, the fourth exhaust valve 559*a*, and the pulse vent line orifice 559*b*, the pulse vent line 559, the fourth exhaust valve 559*a*, and the pulse vent line orifice 559*b* may be omitted as illustrated in FIG. 13.

Although it has been illustrated that the pressure adjustment member 553*b* is disposed in-line with the flow line 553, the inventive concept is not limited thereto. For example, a flow line orifice 553*c* instead of the pressure adjustment member 553*b* may be disposed in-line with the flow line 553. The flow line orifice 553*c* may have a hydraulic diameter suitable for maintaining the pressure in the inner space 518 at the set pressures P1 and P2.

Figure 15:
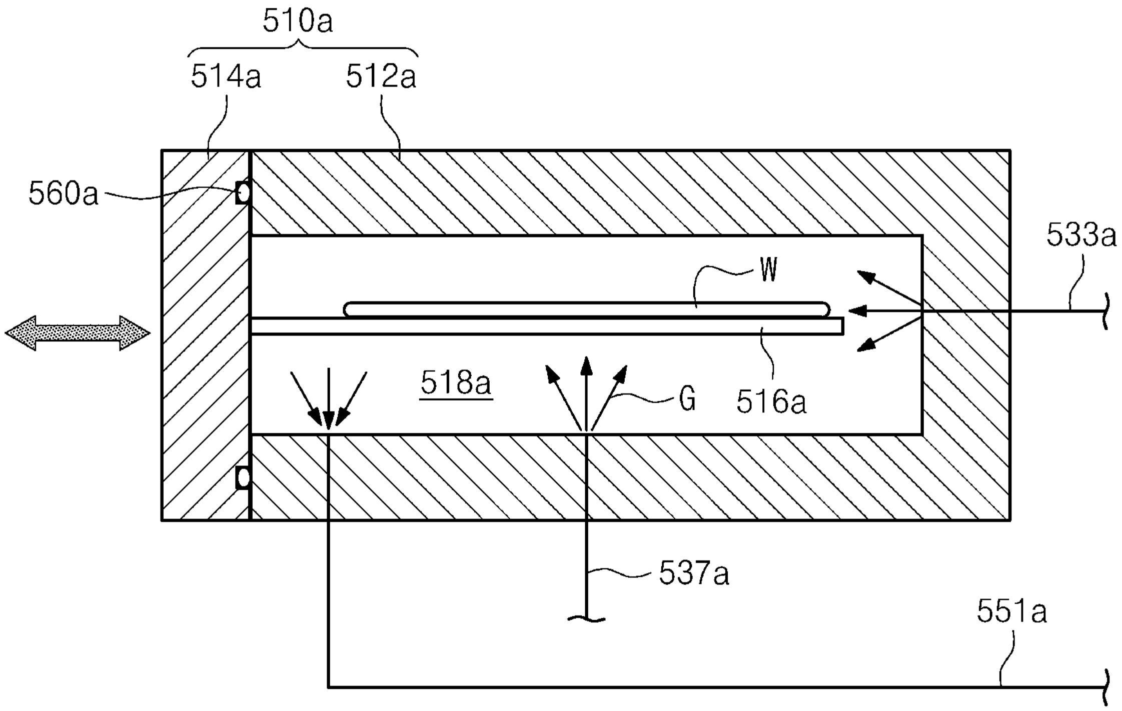
FIG. 15 is a schematic view illustrating a drying chamber according to another embodiment of the inventive concept.

Although it has been illustrated that the body 510 includes the upper body 512 and the lower body 514, the inventive concept is not limited thereto. For example, as illustrated in FIG. 15, a body 510*a* may include a base body 512*a* and a door body 514*a*. The base body 512*a* and the door body

514*a* may be combined with each other to form an inner space 518*a*. The base body 512*a* may have a container shape that is open at one side, and the door body 514*a* may move in a lateral direction to selectively open and close the inner space 518*a*. A sealing member 560*a* may be provided between the door body 514*a* and the base body 512*a*. A support plate 516*a* may be coupled to the door body 514*a*, and a substrate W may be supported on the support plate 516*a*.

A first supply line 533*a* may supply a drying fluid G from a side to the substrate W supported on the support plate 516*a*. A second supply line 537*a* may supply the drying fluid G from below the substrate W. A main exhaust line 551*a* may evacuate the inner space 518*a* from below the substrate W. The components of the fluid supply unit 530 and the fluid exhaust unit 550 may be identically/similarly applied.

As described above, according to the embodiments of the inventive concept, the substrate treating apparatus and method may efficiently treat a substrate.

Furthermore, according to the embodiments of the inventive concept, the substrate treating apparatus and method may improve efficiency in drying a substrate.

Moreover, according to the embodiments of the inventive concept, the substrate treating apparatus and method may reduce time spent performing a drying process of drying a substrate.

In addition, according to the embodiments of the inventive concept, the substrate treating apparatus and method may minimize impurities, such as particles, while performing a drying process of drying a substrate.

Effects of the inventive concept are not limited to the above-described effects, and any other effects not mentioned herein may be clearly understood from this specification and the accompanying drawings by those skilled in the art to which the inventive concept pertains.

The above description exemplifies the inventive concept. Furthermore, the above-mentioned contents describe embodiments of the inventive concept, and the inventive concept may be used in various other combinations, changes, and environments. That is, variations or modifications can be made to the inventive concept without departing from the scope of the inventive concept that is disclosed in the specification, the equivalent scope to the written disclosures, and/or the technical or knowledge range of those skilled in the art. The written embodiments describe the best state for implementing the technical spirit of the inventive concept, and various changes required in specific applications and purposes of the inventive concept can be made. Accordingly, the detailed description of the inventive concept is not intended to restrict the inventive concept in the disclosed embodiment state. In addition, it should be construed that the attached claims include other embodiments.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An apparatus for treating a substrate, the apparatus comprising:

a body having an inner space in which the substrate is dried by a drying fluid in a supercritical state;

a fluid supply unit configured to supply the drying fluid into the inner space;

a fluid exhaust unit configured to release the drying fluid from the inner space and including:

a main exhaust line connected with the body;

a plurality of branch lines connected to the main exhaust line, wherein the plurality of branch lines includes a flow line;

a controller configured to control the fluid supply unit and the fluid exhaust unit to perform:

a pressure-raising step of raising pressure in the inner space to a set pressure; and a flow step of generating a flow of the drying fluid in the inner space by releasing, by the fluid exhaust unit, the drying fluid from the inner space while the fluid supply unit supplies the drying fluid into the inner space; and a pressure adjustment member installed at the flow line and configured to:

measure pressure of the drying fluid flowing through the main exhaust line; and adjust the pressure in the inner space to the set pressure by adjusting an amount of the drying fluid released per unit time through the flow line.

2. The apparatus of claim 1, wherein the controller is configured to control the fluid supply unit and the fluid exhaust unit such that the pressure in the inner space is maintained at the set pressure while the flow step is performed.

3. The apparatus of claim 1, wherein the controller is configured to control the fluid supply unit and the fluid exhaust unit such that an amount of the drying fluid supplied into the inner space per unit time by the fluid supply unit is equal to an amount of the drying fluid released from the inner space per unit time by the fluid exhaust unit while the flow step is performed.

4. The apparatus of claim 1, wherein the fluid exhaust unit further includes:

a first exhaust valve configured to selectively flow the drying fluid through the main exhaust line, and wherein the controller is configured control the fluid supply unit and the fluid exhaust unit such that the first exhaust valve remains turned on while the flow step is performed.

5. The apparatus of claim 4, wherein the fluid exhaust unit further includes:

a slow vent line branched from the main exhaust line;

a second exhaust valve installed at the slow vent line;

a quick vent line branched from the main exhaust line; and a third exhaust valve installed at the quick vent line, wherein the first exhaust valve is installed at the flow line, and wherein an amount of the drying fluid released per unit time through the quick vent line is greater than an amount of the drying fluid released per unit time through the slow vent line.

6. The apparatus of claim 5, wherein the controller is configured to control the fluid supply unit and the fluid exhaust unit to perform:

a first vent step of lowering the pressure in the inner space by releasing the drying fluid in the inner space through the slow vent line by turning on the second exhaust valve; and a second vent step of lowering the pressure in the inner space through the quick vent line by turning on the third exhaust valve.

7. The apparatus of claim 1,
wherein the controller is configured to control the fluid supply unit and the fluid exhaust unit such that the flow step is performed for a time period between 20 seconds and 65 seconds.

8. The apparatus of claim 7,
wherein the controller is configured to control the fluid supply unit and the fluid exhaust unit such that the flow step is performed for a time period between 25 seconds and 65 seconds.

9. The apparatus of claim 2,
wherein the controller is configured to control the fluid supply unit and the fluid exhaust unit such that the set pressure has a value between 120 Bar and 150 Bar.

10. The apparatus of claim 9,
wherein the controller is configured to control the fluid supply unit and the fluid exhaust unit such that the set pressure is equal to 150 Bar.

11. An apparatus for treating a substrate, the apparatus comprising:
a body having an inner space in which the substrate is dried by a drying fluid in a supercritical state;
a fluid supply unit configured to supply the drying fluid into the inner space;
a fluid exhaust unit configured to release the drying fluid from the inner space; and
a controller,
wherein the fluid exhaust unit includes:
a main exhaust line connected with the body; and
a first exhaust valve configured to cause the drying fluid to selectively flow through the main exhaust line,
wherein the controller is configured to perform:
a pressure-raising step of raising pressure in the inner space to a set pressure;
a flow step of maintaining the pressure in the inner space at the set pressure; and
a vent step of lowering the pressure in the inner space, and
wherein the controller is configured to control the fluid supply unit and the fluid exhaust unit such that the first exhaust valve remains turned on during the flow step.

12. The apparatus of claim 11,
wherein the controller is configured to control the fluid supply unit and the fluid exhaust unit such that an amount of the drying fluid supplied per unit time by the fluid supply unit is equal to an amount of the drying fluid released per unit time through the main exhaust line during the flow step.

13. The apparatus of claim 12,
wherein the fluid exhaust unit further includes a pressure adjustment member configured to adjust the pressure in the inner space to the set pressure, based on pressure of the drying fluid flowing through the main exhaust line during the flow step.

14. The apparatus of claim 13,
wherein the main exhaust line branches into branch lines, and
wherein the branch lines include:
a vent line configured to lower the pressure in the inner space, and
a flow line having the first exhaust valve and the pressure adjustment member installed thereon.

15. The apparatus of claim 11,
wherein the fluid supply unit includes:
a first supply line configured to supply the drying fluid from above the substrate supported in the inner space; and
a second supply line configured to supply the drying fluid from below the substrate supported in the inner space.

16. The apparatus of claim 11,
wherein the fluid supply unit includes:
a first supply line configured to supply the drying fluid from a side to the substrate supported in the inner space; and
a second supply line configured to supply the drying fluid from below the substrate supported in the inner space.

17. An apparatus for treating a substrate, the apparatus comprising:
a body having an inner space in which an organic solvent remaining on the substrate is dried by a drying fluid in a supercritical state;
a fluid supply unit configured to supply the drying fluid into the inner space;
a fluid exhaust unit configured to release the drying fluid from the inner space; and
a controller,
wherein the controller is configured to perform:
a pressure-raising step of raising pressure in the inner space to a set pressure by supplying, by the fluid supply unit, the drying fluid into the inner space;
a flow step of generating a flow of the drying fluid in the inner space by releasing, by the fluid exhaust unit, the drying fluid from the inner space while the fluid supply unit supplies the drying fluid into the inner space; and
a vent step of lowering the pressure in the inner space by releasing, by the fluid exhaust unit, the drying fluid from the inner space, and
wherein the controller is configured to control the fluid supply unit and the fluid exhaust unit such that an amount of the drying fluid supplied into the inner space per unit time by the fluid supply unit is equal to an amount of the drying fluid released from the inner space per unit time by the fluid exhaust unit while the flow step is performed.

18. The apparatus of claim 17,
wherein the fluid exhaust unit includes:
a main exhaust line connected with the body and configured to evacuate the inner space;
a vent line branched from the main exhaust line and lower the pressure in the inner space;
a flow line branched from the main exhaust line; and
a pressure adjustment member and a first exhaust valve installed at the flow line,
wherein the pressure adjustment member is configured to adjust the pressure in the inner space to the set pressure, based on pressure of the drying fluid flowing through the main exhaust line, and
wherein the controller is configured to control the fluid supply unit and the fluid exhaust unit such that while the flow step is performed, the first exhaust valve remains turned on to release the drying fluid through the main exhaust line and the flow line.

19. The apparatus of claim 18,
wherein the vent line includes:
a quick vent line having a third exhaust valve installed at the quick vent line; and
a slow vent line having a second exhaust valve installed at the slow vent line, wherein an amount of the drying fluid released per unit time through the slow vent line is less than an amount of the drying fluid released per unit time through the quick vent line, and wherein the controller is configured to control the second exhaust valve and the third exhaust valve such that in the vent step, the drying fluid is released through the quick vent line after the drying fluid is released through the slow vent line.

* * * * *